United States Patent
Kudo

(10) Patent No.: US 7,962,488 B2
(45) Date of Patent: *Jun. 14, 2011

(54) SEARCHING APPARATUS AND SEARCHING METHOD

(75) Inventor: Shigetaka Kudo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.
This patent is subject to a terminal disclaimer.

(21) Appl. No.: 12/581,493

(22) Filed: Oct. 19, 2009

(65) Prior Publication Data

US 2010/0036841 A1    Feb. 11, 2010

Related U.S. Application Data

(63) Continuation of application No. 10/398,196, filed as application No. PCT/JP02/07163 on Jul. 15, 2002, now Pat. No. 7,606,830.

(30) Foreign Application Priority Data

Aug. 3, 2001 (JP) .................................. 2001-237175

(51) Int. Cl.
*G06F 7/00* (2006.01)
*G06F 17/30* (2006.01)

(52) U.S. Cl. .......................... 707/737; 707/758; 707/916

(58) Field of Classification Search .................. 707/737, 707/758, 916
See application file for complete search history.

(56) References Cited

U.S. PATENT DOCUMENTS

| | | | | |
|---|---|---|---|---|
| 6,606,747 B1 * | 8/2003 | Yuen et al. | | 725/40 |
| 7,606,830 B2 * | 10/2009 | Kudou | | 1/1 |
| 2001/0037430 A1 * | 11/2001 | Heo | | 711/112 |
| 2002/0057297 A1 * | 5/2002 | Grimes et al. | | 345/810 |
| 2002/0152278 A1 * | 10/2002 | Pontenzone et al. | | 709/217 |
| 2003/0033420 A1 * | 2/2003 | Eyal et al. | | 709/231 |

FOREIGN PATENT DOCUMENTS

| | | |
|---|---|---|
| JP | 10-208445 A | 8/1998 |
| JP | 11-242496 | 9/1999 |

OTHER PUBLICATIONS

The Wayback Machine, http://freedownloadscenter.com/Multimedia_andGraphics/Multi-Purpose_Player_and_Editors/WoLoSoft_Juke.html, WoLoSoft International, May 2, 2001.*
The Wayback Machine, http://www.wolosoft.com/en/raduga/help/options_intro.html, WoLoSoft International, Jul. 21, 2001.*

(Continued)

*Primary Examiner* — Mohammad Ali
*Assistant Examiner* — Patrick A Darno
(74) *Attorney, Agent, or Firm* — Wolf, Greenfield & Sacks, P.C.

(57) ABSTRACT

When an album search is started, message "For Album ?" which prompts the user to select album search is displayed. When the user has selected the album search, message "By Title ?" which prompts the user to select album title name search is displayed. When the user has selected the title name search, message "Keyword IN" which prompts the user to input a key word is displayed. When the user has input key word "P" for the search, the HD recording and reproducing device 300 references the album/track name database file and searches the database file for an album title name containing the input key word. The search result is displayed. In addition, highlight portions of tracks of an album corresponding to the search result are successively reproduced from track 1.

2 Claims, 36 Drawing Sheets

OTHER PUBLICATIONS

The Wayback Machine, http://www.wolosoft.com/en/raduga/help/howto_player.html, WoLoSoft International, Jul. 20, 2001.*

Kimihiko Kimura, "Sumitomo Kinzoku System Kaihatsu MP3 JUKEBOX4.4 by MusicMatch," PC Fan, vol. 7, No. 9, Mainichi Communications Inc. (JP), May 15, 2000, p. 133.

Tamosuke Kadotani, "Sukina Ongaku o Digital-ka Pasocon o Juke Box ni! MP3 File Sakusei Hayawakari Guide," First Edition, Kabushiki Kaisha Kogakusha (JP) Oct. 10, 1999, pp. 108-111.

The Wayback machine, http://www.freedownloadsceter.com/Multimedia_andGraphics/Multi-Purpose_Player_and_Editors/WoLoSoft_Juke.html, WoLoSoft International, May 2, 2001.

The Wayback Machine, http://www.wolosoft.com/en/raduga/help/options_intro.html, WoLoSoft International, Jul. 21, 2001.

The Wayback Machine, http://www.wolosoft.com/en/raduga/help/howto_player.html, WoLoSoft International, Jul. 20, 2001.

* cited by examiner

| FRAME | P | Q | R | S | T | U | V | W |
|---|---|---|---|---|---|---|---|---|
| F1 | S0 | | | | | | | |
| F2 | S1 | | | | | | | |
| F3 | P1 | Q1 | R1 | S1 | T1 | U1 | V1 | W1 |
| F4 | P2 | Q2 | R2 | S2 | T2 | U2 | V2 | W2 |
| ⋮ | ⋮ | ⋮ | ⋮ | ⋮ | ⋮ | ⋮ | ⋮ | ⋮ |
| F95 | P93 | Q93 | R93 | S93 | T93 | U93 | V93 | W93 |
| F96 | P94 | Q94 | R94 | S94 | T94 | U94 | V94 | W94 |
| F97 | P95 | Q95 | R95 | S95 | T95 | U95 | V95 | W95 |
| F98 | P96 | Q96 | R96 | S96 | T96 | U96 | V96 | W96 |

| Address | | | | | | | | |
|---|---|---|---|---|---|---|---|---|
| 0x0000 | BLKID-TL0 | | | | | | | |
| 0x0010 | | | | | | | | |
| 0x0020 | | | | | | | | |
| 0x0120 | | | | T-ALB | | | | |
| 0x0320 | | | | | | | | |
| 0x0330 | | | | | REVISION | | | |
| 0x0350 | Alb-001 | Alb-002 | Alb-003 | Alb-004 | Alb-005 | Alb-006 | Alb-007 | Alb-008 |
| 0x0360 | Alb-009 | Alb-010 | Alb-011 | Alb-012 | Alb-013 | Alb-014 | Alb-015 | Alb-016 |
| 0x0740 | Alb-505 | Alb-506 | Alb-507 | Alb-508 | Alb-509 | Alb-510 | | |
| 0x3ff0 | BLKID-TL0 | | | | REVISION | | | |

Fig. 14A

| | | | | |
|---|---|---|---|---|
| 0x0000 | BLKID-TL0 | | REVISION | |
| 0x0010 | | T-ALB | | |

Fig. 14B

| | | | | | | | |
|---|---|---|---|---|---|---|---|
| 0x0020 | | | | | | | |
| 0x0120 | | | | | | | |
| 0x0320 | | | | | | | |
| 0x0330 | | | | | | | |
| 0x0350 | Alb-001 | Alb-002 | Alb-003 | Alb-004 | Alb-005 | Alb-006 | Alb-007 | Alb-008 |
| 0x0360 | Alb-009 | Alb-010 | Alb-011 | Alb-012 | Alb-013 | Alb-014 | Alb-015 | Alb-016 |
| 0x0350 | Alb-505 | Alb-506 | Alb-507 | Alb-508 | Alb-509 | Alb-510 | | |
| 0x0740 | BLKID-TL0 | | | REVISION | | | |
| 0x3ff0 | | | | | | | |

REPRODUCTION MANAGEMENT FILE

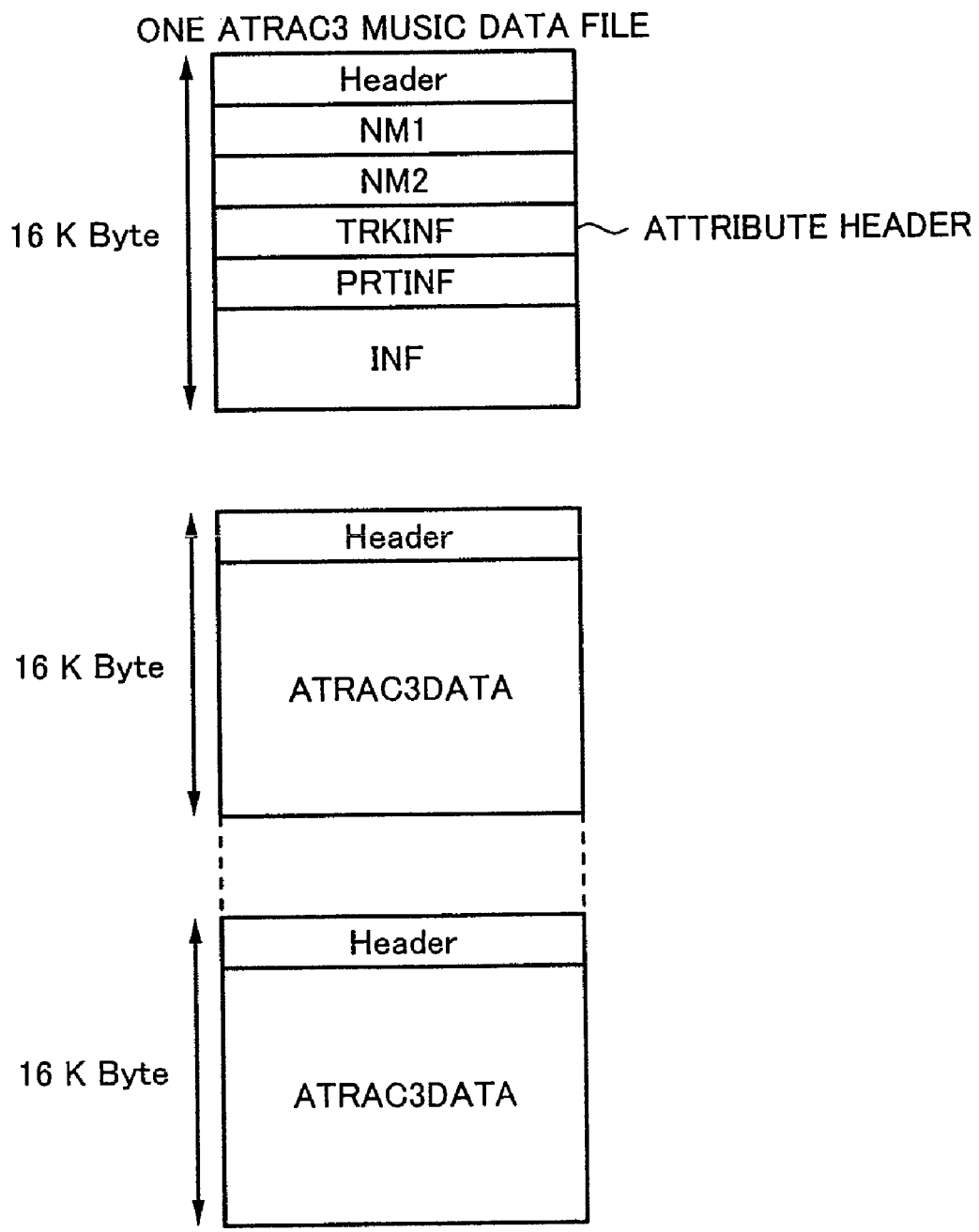

Fig. 18

| | | | | | | | |
|---|---|---|---|---|---|---|---|
| 0x0000 | BLKID-TL0 | | Reserved | Mcode | REVISION | | Reserved |
| | SN1C+L | SN2C+L | SINFSIZE | T-TRK | Reserved | | |
| 0x0020 | NM1-S(256) | | | | | | |
| 0x0120 | NM1-S(512) | | | | | | |
| 0x0320 | Reserved | | | | | CONTENTSKEY | |
| 0x0330 | Reserved | | | | | C_MAC[0] | |
| | | | | | | | S-YMDhms |
| 0x0350 | TRK-001 | TRK-002 | TRK-003 | TRK-004 | TRK-005 | TRK-006 | TRK-007 | TRK-008 |
| 0x0360 | TRK-009 | TRK-010 | TRK-011 | TRK-012 | TRK-013 | TRK-014 | TRK-015 | TRK-016 |
| 0x0660 | TRK-393 | TRK-394 | TRK-395 | TRK-396 | TRK-397 | TRK-398 | TRK-399 | TRK-400 |
| 0x0670 | INF-S(14720) | | | | | | |
| 0x3ff0 | BLKID-TL0 | | Reserved | Mcode | REVISION | | Reserved |

Fig. 19A

| 0x0000 | BLKID-TL0 | Reserved | Mcode | REVISION | Reserved |
|---|---|---|---|---|---|
|  | SN1C+L | SN2C+L | SINFSIZE | T-TRK | Reserved |

Fig. 19B

| 0x0020 | NM1-S(256) | | | | | | |
|---|---|---|---|---|---|---|---|
| 0x0120 | NM1-S(512) | | | | | | |
| 0x0320 | Reserved | | | | | CONTENTSKEY | |
| 0x0330 | Reserved | | | | | C_MAC[0] | S-YMDhms |
| 0x0350 | TRK-001 | TRK-002 | TRK-003 | TRK-004 | TRK-005 | TRK-006 | TRK-007 | TRK-008 |
| 0x0360 | TRK-009 | TRK-010 | TRK-011 | TRK-012 | TRK-013 | TRK-014 | TRK-015 | TRK-016 |
| 0x0660 | TRK-393 | TRK-394 | TRK-395 | TRK-396 | TRK-397 | TRK-398 | TRK-399 | TRK-400 |
| 0x0670 | INF-S(14720) | | | | | | | |
| 0x3ff0 | BLKID-TL0 | | Reserved | Mcode | REVISION | Reserved | | |

Fig. 19C

| INF | 0x00 | ID | 0x00 | SIZE | Mcode | C+L | Reserved | DATA, VARIABLE LENGTH |
|---|---|---|---|---|---|---|---|---|

Fig. 20

| Addr | | | | | | | |
|---|---|---|---|---|---|---|---|
| 0x0000 | BLKID-HD0 | Reserved | Mcode | REVISION | | BLOCK SERIAL | |
| 0x0010 | N1C+L | N2C+L | INFSIZE | T-PRT | T-SU | INX | XT |
| 0x0020 | NM1(256) | | | | | | |
| 0x0120 | NM1(512) | | | | | | |
| 0x0310 | | | | | | | |
| 0x0320 | Reserved | | | CONTENTSKEY | | | |
| | Reserved | | | C_MAC[n] | | | |
| | Reserved | | | | WM | A | LT | FNo |
| | MG(D)SERIAL-nnn(Upper) | | | MG(D)SERIAL-nnn(Lower) | | | |
| 0x0360 | CONNUM | | YNDhms-S | YNDhms-E | MT | CT | CC | CN |
| 0x0370 | PRTSIZE | | PRTKEY | | | Reserved | |
| 0x0380 | | | CONNUM-0 | PRTSIZE(0x0388) | | PRTKEY | |
| 0x0390 | | | | | | CONNUM-0 | |
| | INF (0x0400); START POSITION OF INF DEPENDS ON NUMBER OF PRINTINFS | | | | | | |
| 0x3FF0 | BLKID-HD0 | Reserved | Mcode | Reserved | | BLOCK SERIAL | |
| 0x4000 | BLKID-A3D | Reserved | Mcode | CONNUM-0 | | BLOCK SERIAL | |
| 0x4010 | BLOCK SERIAL | | | INITIALIZATION VECTOR | | | |
| 0x4020 | SU-000(Nbyte = 384byte) | | | | | | |
| 0x41A0 | SU-001(Nbyte) | | | | | | |
| 0x4320 | SU-002(Nbyte) | | | | | | |
| 0x04A0 | SU-041(Nbyte) | | | | | | |
| 0x7DA0 | | | | | | | |
| 0x7F20 | Reserved(Nbyte = 208byte) | | | | | | |
| | BLOCK SEED | | | | | | |
| 0x7FF0 | BLKID-A3D | Reserved | Mcode | CONNUM-0 | | BLOCK SERIAL | |

Fig. 21

|  | 0 1 | 2 3 | 4 5 | 6 7 | 8 9 A B | C D | E F |
|---|---|---|---|---|---|---|---|
| 0x0000 | BLKID-HD0 | | Reserved | Mcode | Reserved | BLOCK SERIAL | |
| 0x0010 | N1C+L | N2C+L | INFSIZE | T-PRT | T-SU | INX | XT |
| 0x0020 | NM1(256) | | | | | | |
| 0x0120 | NM2(512) | | | | | | |
| 0x0310 | | | | | | | |

Fig. 22

| | | | | | |
|---|---|---|---|---|---|
| 0x0320 | Reserved (8) | | CONTENTSKEY | | |
| | Reserved (8) | | MAC | | |
| | Reserved (12) | | A | LT | FNo |
| | MG(D)SERIAL-nnn | | | | |
| 0x0360 | CONNUM | YMDhms-S | YMDhms-E | MT | CT | CC | CN |

Fig. 23 bit7:ATRAC3MODE      0:DUAL    1:Joint
bit6,5,4 N OF 3 BITS REPRESENTS MODE VALUE

| N | MODE | DURATION | TRANSFER RATE | SU | BYTES |
|---|---|---|---|---|---|
| 7 | HQ | 47min | 176kbps | 31SU | 512 |
| 6 |  | 58min | 146kbps | 38SU | 424 |
| 5 | EX | 64min | 132kbps | 42SU | 384 |
| 4 | SP | 81min | 105kbps | 53SU | 304 |
| 3 |  | 90min | 94kbps | 59SU | 272 |
| 2 | LP | 128min | 66kbps | 84SU | 192 |
| 1 | mono | 181min | 47kbps | 119SU | 136 |
| 0 | mono | 258min | 33kbps | 169SU | 96 | bit3:Reserved
bit2:DATE TYPE      0:AUDIO                    1:OTHER
bit1:REPRODUCTION SKIP  0:NORMAL REPRODUCTION  1:SKIP
bit0:EMPHASIS        0:OFF                          1:ON(50/15 $\mu$ S)

Fig. 24

|  |  |  |  |
|---|---|---|---|
| bit7 | COPY PERMISSION | 0:PROHIBITS COPY | 1:PERMIT COPY |
| bit6 | GENERATION | 0:ORIGINAL | 1:FIRST GENERATION OR LATER |
| bit5-4 | COPY CONTROL WITH RESPECT TO HIGH SPEED DIGITAL COPY | | |
|  | 00:PROHIBITS COPY  01:FIRST COPY GENERATION  10:PERMITS COPY | | |
|  | CHILD COPY OF FIRST GENERATION COPY IS PROHIBITED | | |
| HCMS bit3-2 | MagicGateAUTHENTICATION LEVEL | | |
|  | 00:Level10(Non-MG)  01:Level1 | | |
|  | 10:Level2  11:Reserved | | |
|  | UNLESS LEVEL IS 10, TRACK CANNOT BE DIVIDED OR COMBINED | | |
| bit1,0 | Reserved | | |

Fig. 25

| | | | |
|---|---|---|---|
| 0x0370 | PRTSIZE | PRTKEY | Reserved (8) |
| 0x0380 | CONNUM0 | PRTSIZE(0x0388) | PRTKEY |
| 0x0390 | Reserved (8) | | CONNUM0 |

Fig. 26

| | | | | | |
|---|---|---|---|---|---|
| 0x4000 | BLKID-A3D | Reserved | Mcode | CONNUM0 | BLOCK SERIAL |
| 0x4010 | BLOCK SEED | | | INITIALIZATION VECTOR | |
| 0x4020 | SU-000 (Nbyte = 384 byte) | | | | |

Fig. 27

| ANM0 | | 1 | | |
|---|---|---|---|---|
| 1 | 0X0209 | ALBUM NAME 1 | 0X0209 | ARTIST 1 |
| 2 | 0X0000 | 0 | 0X0000 | 0 |
| | | | | |
| 61 | 0X0209 | ALBUM NAME 61 | 0X0209 | ARTIST 61 |
| 62 | 0X0209 | ALBUM NAME 62 | 0X0209 | ARTIST 62 |
| RESERVED | | | | |
| (ALBUM NAME TRACK) | | ⋮ | | |
| ANM0 | | 9 | | |
| 497 | 0X0209 | ALBUM NAME 1 | 0X0209 | ARTIST 1 |
| 498 | 0X0000 | 0 | 0X0000 | 0 |
| 499 | | | | |
| 500 | 0X0209 | ALBUM NAME 62 | 0X0209 | ARTIST 62 |
| | | | | |
| | | | | |
| | | | | |
| RESERVED | | | | |
| TNM0 | | 10 | | |
| 1 | 0X0209 | TRACK NAME 1 | 0X0209 | ARTIST 1 |
| 2 | 0X0000 | 0 | 0X0000 | 0 |
| | | | | |
| 61 | 0X0209 | TRACK NAME 61 | 0X0209 | ARTIST 61 |
| 62 | 0X0209 | TRACK NAME 62 | 0X0209 | ARTIST 62 |
| RESERVED | | | | |
| MUSIC PROGRAM NAME BLOCK | | ⋮ | | |
| TNM0 | | 332 | | |
| 19965 | 0X0209 | TRACK NAME 19965 | 0X0209 | ARTIST 19972 |
| 19966 | 0X0000 | 0 | 0X0000 | 0 |
| | | | | |
| 19999 | 0X0209 | TRACK NAME 19999 | 0X0209 | ARTIST 19999 |
| 20000 | 0X0209 | TRACK NAME 20000 | 0X0209 | ARTIST 20000 |
| | | | | |
| | | | | |
| | | | | |
| | | | | |
| RESERVED | | | | |

Fig. 28

| BLK-ID | BLOCK SERIAL NUMBER |
|---|---|
| 4 BYTES | 4 BYTES |

Fig. 29

| ALBUM/PROGRAM FILE NUMBER | RESERVED | CHARACTER LANGUAGE CODE | PROGRAM/ ALBUM NAME | CHARACTER LANGUAGE CODE | ARTIST NAME |
|---|---|---|---|---|---|
| 2 BYTES | 2 BYTES | 2 BYTES | 128 BYTES | 2 BYTES | 128 BYTES |

Fig. 30

| TRK0 | 1 | | | |
|---|---|---|---|---|
| 1 | 1 | 10320 | 1 | 1 |
| 2 | 1 | 7740 | 1 | 2 |
| 3 | 2 | 12900 | 2 | 1 |
| 4 | 0 | 0 | 0 | 0 |
| | | | | |
| | | | | |
| 1364 | 0 | 0 | 0 | 0 |
| 1365 | 0 | 0 | 0 | 0 |
| RESERVED | | | | |
| TRK0 | 2 | | | |
| 1366 | 0 | 0 | 0 | 0 |
| | | | | |
| | | | | |
| 2729 | 0 | 0 | 0 | 0 |
| 2730 | 0 | 0 | 0 | 0 |
| RESERVED | | | | |
| BLOCKS 3 TO 14 | | | | |
| TRK0 | 15 | | | |
| 19111 | 0 | 0 | 0 | 0 |
| | | | | |
| 19999 | 500 | 10320 | 0 | 0 |
| 20000 | 499 | 9030 | 500 | 1 |
| | | | | |
| | | | | |
| | | | | |
| RESERVED | | | | |

Fig. 31

| BLK-ID | BLOCK SERIAL NUMBER |
|---|---|
| 4 BYTES | 4 BYTES |

Fig. 32

| MUSIC PROGRAM FILE NUMBER | ALBUM FILE NUMBER | TOTAL SUS OF MUSIC PROGRAM | TOCDB IDX | TOC TNO |
|---|---|---|---|---|
| 2 BYTES | 2 BYTES | 4 BYTES | 2 BYTES | 2 BYTES |

Fig. 35

| TOC DB IDX | USE STATE | TOC INFORMATION | ....... | TOC INFORMATION |
|---|---|---|---|---|
| 2 BYTES | 2 BYTES | 4 BYTES | ....... | 4 BYTES |

Fig. 36

| Trk No. | AMIN | ASEC | AFRAME |
|---|---|---|---|
| 1 BYTE | 1 BYTE | 1 BYTE | 1 BYTE |

Fig. 38

| ALBUM NUMBER | TITLE | ARTIST NAME |
|---|---|---|
| Album 1 | Miles Smiles | Miles Davis Quintet |
| Album 2 | Pornograffitti | Extreme |
| Album 3 | Master of Puppets | Metallica |
| Album 4 | Distance | Utada Hikaru |
| Album 5 | A day without Rain | Enya |
| Album 6 | Love Songs | Elton John |
| Album 7 | A best | Hamasaki Ayumi |
| Album 8 | 8:30 | Weather Report |

Fig. 39

| Album 7 | 8:30 | Weather Report | |
|---|---|---|---|
| Track 1 | Black Market | Weather Report | 2:22~2:32 |
| Track 2 | Teen Town | Weather Report | 1:44~1:54 |
| Track 3 | A Remark You Made | Weather Report | 2:56~3:06 |
| Track 4 | Slang | Weather Report | 3:00~3:10 |
| Track 5 | In a Silent Way | Weather Report | 0:00~0:10 |
| Track 6 | Birdland | Weather Report | 6:48~6:58 |
| Track 7 | Thanks For The Memory | Weather Report | 2:18~2:28 |
| Track 8 | Badia/Boogie Woogie Waltz Medley | Weather Report | 9:19~9:29 |
| Track 9 | 8:30 | Weather Report | 1:00~1:10 |
| Track 10 | Brown Street | Weather Report | 4:32~4:42 |
| Track 11 | The Orphan | Weather Report | 3:00~3:10 |
| Track 12 | Sightseeing | Weather Report | 0:55~1:05 |

SEARCHING APPARATUS AND SEARCHING METHOD

RELATED APPLICATIONS

This application is a continuation of U.S. application Ser. No. 10/398,196, filed on Apr. 2, 2003, which, in turn claims priority to International Application No. PCT/JP02/07163, filed on Jul. 15, 2002, which, in turn, claims priority to Japanese Application No. JP2001-237175, filed on Aug. 3, 2001, all of which are hereby incorporated herein by reference in their entirety.

TECHNICAL FIELD

The present invention relates to a searching apparatus and a searching method, in particular, to those which allow a plurality of programs recorded on a recording medium to be searched for a desired program.

BACKGROUND ART

Conventional recording mediums used for audio devices have a recording capacity for around 80 minutes of audio data. However, as the recording capacity of recording mediums has been increased, audio data has been able to be recorded for longer time than before. In addition, since prices of recording mediums have been lowered, the users have been able to use recording mediums which have a large recording capacity at low prices. Among these recording mediums, a hard disk drive (hereinafter abbreviates as HDD) is the most attractive recording medium because of a large recording capacity and a low price.

Since the HDD can store much more albums than the conventional recording mediums, it is difficult for the user to know the location of his or her desired album/track in the HDD at once. To solve such a problem, a reproducing device which can search a large number of albums/tracks stored in a HDD for use's desired album/track using a name of the album/track name and an artist name thereof at high speed has been proposed.

When albums/tracks are searched using an artist name on such a reproducing device, so many album names or track names may be output. Thus, they may not be displayed on a screen at a time. In this case, the user should search these album names or track names for his or her desired album name or track name while scrolling the screen. Thus, it is troublesome for the user to search for his or her desired album or track.

In addition, since data is searched using only characters, not in an intuitive manner, it takes a long time to search for user's desired album or track.

In addition, when a large number of albums/tracks have been recorded in the HDD, the user often has a difficulty to know his or her desired album name or track name (music title). As a result, it was difficult for the user to do that.

Thus, an object of the present invention is to provide a searching apparatus and a searching method which allows the user to easily search for his or her desired album or track.

Another object of the present invention is to provide a searching apparatus and a searching method which allow the user to intuitively search for his or her desired album or track.

A further object of the present invention is to provide a searching apparatus and a searching method which allow the user to easily search for his or her desired album and track without need to know their names.

DISCLOSURE OF THE INVENTION

To solve the foregoing problem, one embodiment of the present invention is a searching apparatus for searching for a desired program/group recorded on a recording medium, the recording medium having a program area and a management area, a plurality of programs having been recorded in the program area, the programs being managed as groups in the management area, group names and program names of programs of the groups being managed in the management area, highlight portions of representative programs of the groups and highlight portions of the programs being managed in the management area, the searching apparatus comprising:

input means for inputting a part or all of a name of a desired program/album as a search object;

comparing means for comparing the part or all of the name of the program/album which has been input by the input means with the program names/group names managed in the management area of the recording medium;

displaying means for displaying a desired program/group candidate list in accordance with compared results of the comparing means; and controlling means for causing the displaying means to display the candidate list and reproducing highlight portions of the programs/groups on the candidate list.

One embodiment of the present invention is a searching method for searching for a desired program/group recorded on a recording medium, the recording medium having a program area and a management area, a plurality of programs having been recorded in the program area, the programs being managed as groups in the management area, group names and program names of programs of the groups being managed in the management area, highlight portions of representative programs of the groups and highlight portions of the programs being managed in the management area, the searching method comprising the steps of:

comparing the part or all of the name of the program/album which has been input with the program names/group names managed in the management area of the recording medium;

displaying a desired program/group candidate list in accordance with compared results obtained at the comparing step; and reproducing highlight portions of the programs/groups on the candidate list.

According to one embodiment of the present invention, the input means inputs a part or all of a name of a desired program/album as a search object. The comparing means compares the part or all of the name of the program/album which has been input by the input means with the program names/group names managed in the management area of the recording medium. The displaying means displays a desired program/group candidate list in accordance with compared results of the comparing means. The controlling means reproduces highlight portions of the programs/groups on the candidate list. Thus, even if a plurality of search results are displayed, the user can easily identify his or her desired program/track.

BRIEF DESCRIPTION OF DRAWINGS

FIG. 13 is a schematic diagram showing data structure of an album number management file.

FIG. 14A is a schematic diagram showing a header portion of the album number management file.

FIG. 14B is a schematic diagram showing the structure of other portions (non-header portion) of the album number management file.

FIG. 16 is a schematic diagram showing the structure of data of which one ATRAC3 data file is divided by a predetermined unit and an attribute file is added to each of the divided files.

FIG. 18 is a schematic diagram showing a data structure of album reproduction management file Pbxxxxxx.msf.

FIG. 19A is a schematic diagram showing a header portion of album reproduction management file Pbxxxxxx.msf.

FIG. 19B is a schematic diagram showing other portions (non-header portion) of album reproduction management file Pbxxxxxx.msf.

FIG. 19C is a schematic diagram showing the structure of additional information data of album reproduction management file Pbxxxxxx.msf.

FIG. 20 is a schematic diagram showing a detailed data structure of an ATRAC3 data file.

FIG. 21 is a schematic diagram showing a data structure of an upper portion of an attribute header which composes an ATRAC3 data file.

FIG. 22 is a schematic diagram showing a data structure of a middle portion of an attribute header which composes an ATRAC3 data file.

FIG. 23 is a table showing recording modes and record durations thereof.

FIG. 24 is a table showing copy control states.

FIG. 25 is a schematic diagram showing a data structure of a lower portion of an attribute header which composes an ATRAC3 data file.

FIG. 26 is a schematic diagram showing a data structure of a header of a data block of an ATRAC3 data file.

FIG. 27 is a schematic diagram showing album/track name database file Namedb.msf.

FIG. 28 shows a block ID portion of album/track name database file Namedb.msf.

FIG. 29 shows a name record portion of album/track name database file Namedb.msf.

FIG. 30 is a schematic diagram showing the structure of reproduction time management database file Playtime.msf.

FIG. 31 shows a block ID portion of reproduction time management database file Playtime.msf.

FIG. 32 shows a TRK record portion of reproduction time management database file Playtime.msf.

FIG. 35 shows an ALBUM TOC record of CD TOC database file Tocdb.msf.

FIG. 36 shows TOC information of an ALBUM TOC record of CD TOC database file Tocdb.msf.

FIG. 38 shows an example of an album stored in the HD recording and reproducing device according to the embodiment of the present invention.

FIG. 39 shows detailed information of album 8 shown in FIG. 8.

BEST MODES FOR CARRYING OUT THE INVENTION

Figure 1:
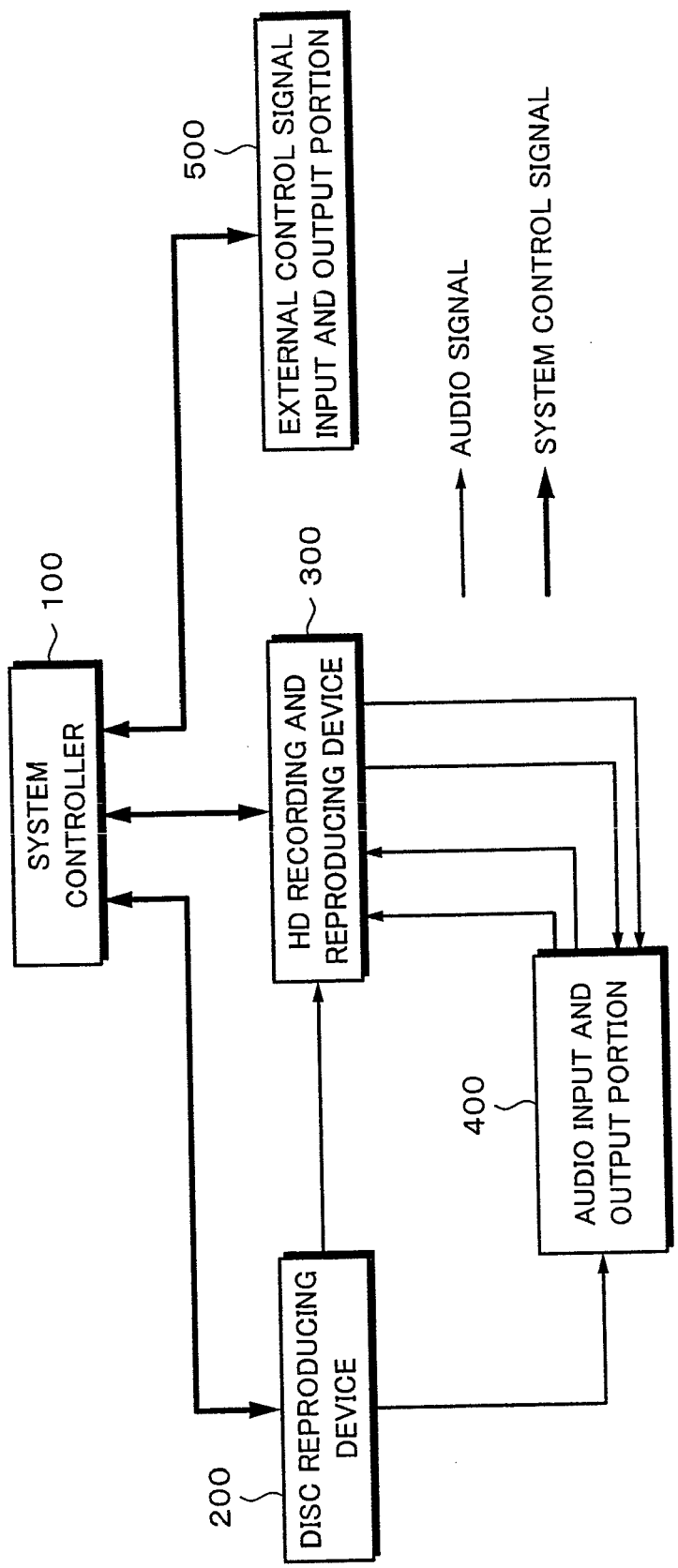
FIG. 1 is a block diagram showing an example of the structure of a dubbing apparatus according to an embodiment of the present invention.

Next, with reference to the accompanying drawings, an embodiment of the present invention will be described. FIG. 1 shows an example of the structure of a dubbing apparatus according to the embodiment of the present invention. As shown in FIG. 1, the dubbing apparatus according to the embodiment of the present invention is composed of a system controller 100, a disc reproducing device 200, a HD recording and reproducing device 300, an audio input and output portion 400, and an external control signal input and output portion 500.

An audio signal which is sent and received between the disc reproducing device 200, the HD recording and reproducing device 300, and the audio input and output portion 400 is an audio signal based on for example IEC 60958 digital audio interface. Since the audio input and output portion 400 has an analog input terminal which will be described later, an analog audio signal is input to an analog input terminal of the audio input and output portion 400. The analog audio signal is converted into a digital signal by an AD converter which will be described later. A serial signal which is synchronized with an LR clock and a bit clock is supplied to the HD recording and reproducing device 300.

Figure 2:
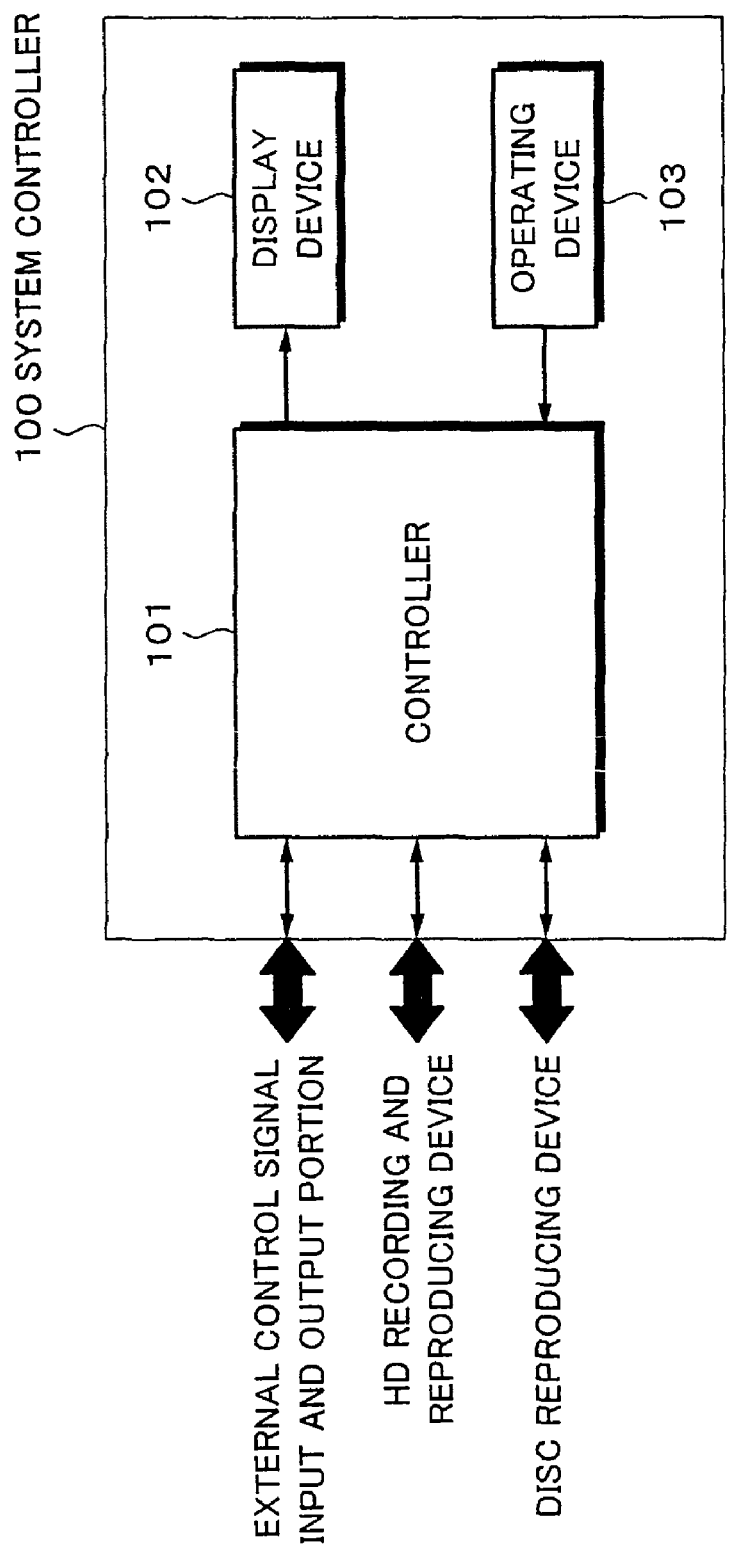
FIG. 2 is a block diagram showing an example of the structure of a system controller 100 according to the embodiment of the present invention.

FIG. 2 is a block diagram showing an example of the structure of the system controller 100 according to the embodiment of the present invention. As shown in FIG. 2, the system controller 100 is composed of a controller 101, a display device 102, and an operating device 103. The controller 101 controls each block of the dubbing apparatus using a system control signal.

The display device 102 is a display device composed of for example a liquid crystal display or an FL tube. The display device 102 is connected to the controller 101. The display device 102 displays data corresponding to a signal supplied from the controller 101. The display device 102 displays information of for example a track number and a play time corresponding to a signal supplied from the controller 101

The operating device 103 is used to operate the dubbing apparatus. In reality, the operating device 103 has a power key, a reproduction key, a pause key, a stop key, a record key, a synchronous record key, a play list registration key, a menu key, a jog key, and so forth.

The power key is used to turn on/off the power of the dubbing apparatus. The reproduction key is used to start reproducing a music file recorded on an optical disc loaded in the disc reproducing device 200 or a music file recorded in the HD recording and reproducing device. The pause key is used to temporarily stop recording/reproducing a file recorded on an optical disc loaded in the disc reproducing device 200 or a file recorded in the HD recording and reproducing device. The stop key is used to stop recording/reproducing a music file recorded on an optical disc loaded in the disc reproducing device 200 or a music file recorded in the HD recording and reproducing device. The record key is used to start recording data to the HD recording and reproducing device.

The synchronous record key is a key used to perform a synchronous recording. The synchronous recording is a recording method for automatically starting and stopping a recording operation in synchronization with the reproduction side. In reality, when the user presses the synchronous record key, the Disc reproducing device 200 starts a reproducing operation and the HD recording and reproducing device 300 also starts a recording operation. When the disc reproducing device 200 stops the reproducing operation, the HD recording and reproducing device 300 stops the recording operation. Thus, without necessity of user's simultaneous operations for the disc reproducing device 200 and the HD recording and reproducing device 300, data reproduced by the disc reproducing device 200 can be easily stored to the HD recording and reproducing device 300. The menu key is used to display a menu for editing operations and so forth on the display device 102. The play list registration key is used to start registering a music program to a play list.

The jog key is structured so that it can be pressed and rotated. In reality, the jog key has intermittent stop positions for example 10 stop position in one turn. At each stop position, data is updated. For example, when the jog key is rotated for one stop position on the right, a value displayed on the display device 102 is updated by +. In contrast, when the jog key rotated for one stop position on the left, a value displayed on the display device 102 is updated by −. With only the jog key, operations for reproduction, pause, stop, record, synchronous record, and menu selection can be performed.

Figure 3:
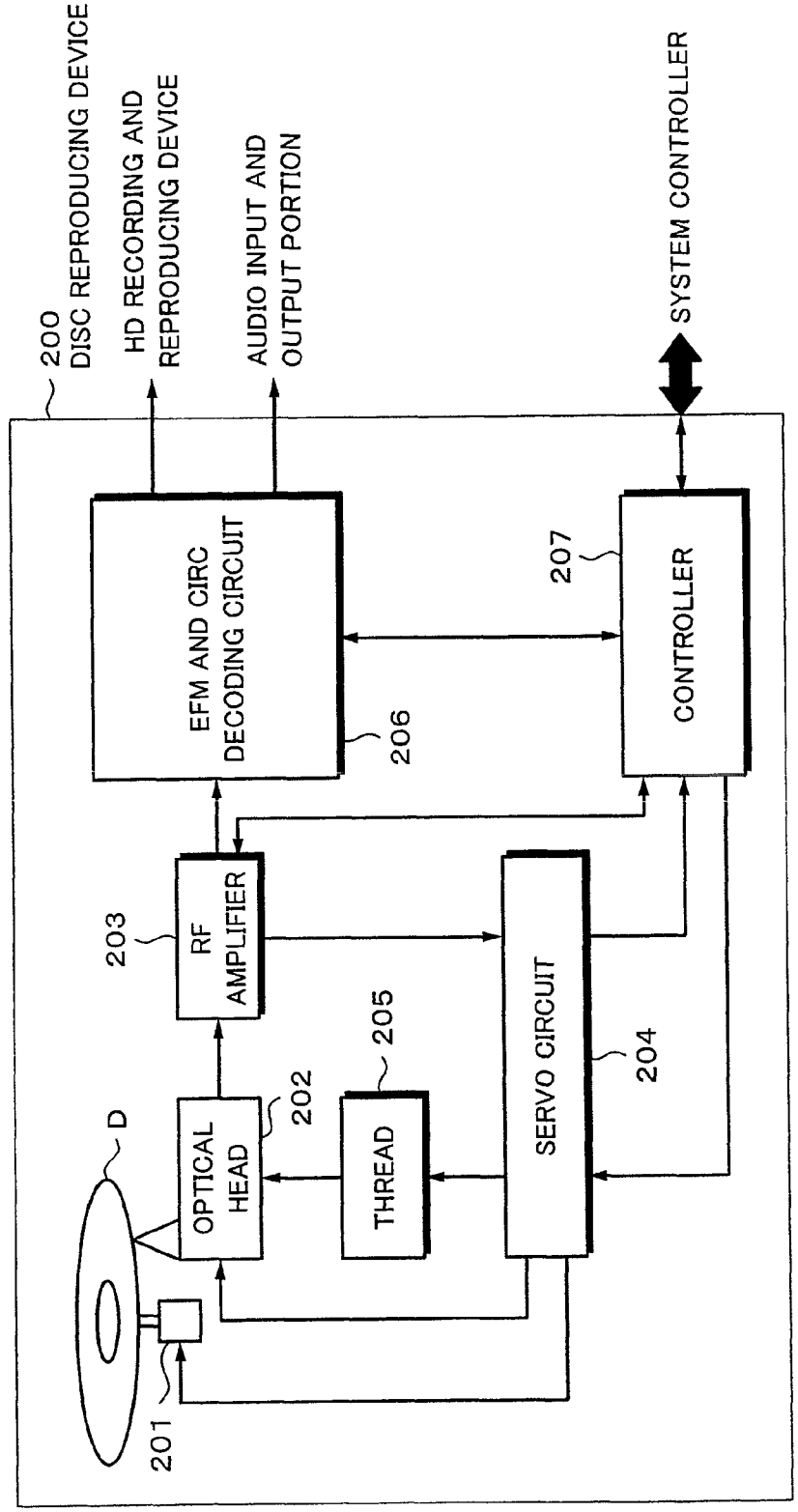
FIG. 3 is a block diagram showing an example of the structure of a disc reproducing device 200 according to the embodiment of the present invention.

FIG. 3 is a block diagram showing an example of the structure of the disc reproducing device 200 according to the embodiment of the present invention. As shown in FIG. 3, the disc reproducing device 200 is composed of a spindle motor 201, an optical head 202, an RF (Radio Frequency) amplifier 203, a servo circuit 204, a thread 205, an EFM (Eight to Fourteen Modulation) and CIRC (Cross Interleave Reed-Solomon Code) decoding circuit 206, and a controller 207. In FIG. 3, an optical disc D is for example a compact disc In a CD reproducing mode, an optical disc D loaded to the disc reproducing device 200 is rotated and driven at constant linear velocity (CLV) by the spindle motor 201.

The optical head 202 radiates laser light to a recoding surface of the optical disc D and receives the reflected light therefrom. As a result, the optical head 202 reads data recorded as pits on the optical disc D and supplies the data to the RF amplifier 203. The intensity of laser light is optimized by an APC (Automatic Power Control) (not shown). The optical head 202 is movable in tracking and focus directions. In addition, the optical head 202 is movable in the radius direction of the optical disc D corresponding to a signal supplied from the thread 205.

The RF amplifier 203 generates a reproduction RF signal, a focus error signal, and a tracking error signal corresponding to the signal supplied from the optical head 202. The focus error signal and the tracking error signal are supplied to the servo circuit 204. The reproduction RF signal is supplied to the EFM and CIRC decoding circuit 206.

The servo circuit 204 generates various drive; signals which are a focus drive signal, a tracking drive signal, a thread drive signal, and a spindle drive signal corresponding to the focus error signal and the tracking error signal supplied from the RF amplifier 203. Corresponding to these signals, the operations of the thread 205 and the spindle motor 201 are controlled.

The EFM and CIRC decoding circuit 206 digitizes the reproduction RF signal supplied from the RF amplifier 203 and obtains an EFM signal. The EFM and CIRC decoding circuit 206 performs an EFM demodulation and a CIRC decode for the EFM signal so that information which has been read from the optical disc is quantized with 16 bits (BInary digit (bit)) and sampled at 44.1 kHz is decoded to a digital signal. The digital signal is supplied to the audio input and output portion 400. The CIRC decode is an error detecting process and an error correcting process which use a CIRC. In reality, the CIRC decode is an error detecting process and an error correcting process using C1 and C2 codes.

The EFM and CIRC decoding circuit 206 extracts control data such as TOC (Table Of Contents) and a sub code (they will be described later) from the reproduction RF signal supplied from the RF amplifier 203 and supplies the extracted control data to the controller 207.

The controller 207 controls each portion corresponding to data such as TOC and sub code supplied from the EFM and CIRC decoding circuit 206. In addition, the controller 207 transmits control data such as TOC and sub code to the system controller 100. In addition, the controller 207 receives a system control signal from the system controller 100. Corresponding to the received control signal, the controller 207 controls each portion of the disc reproducing device 200.

Figure 4:
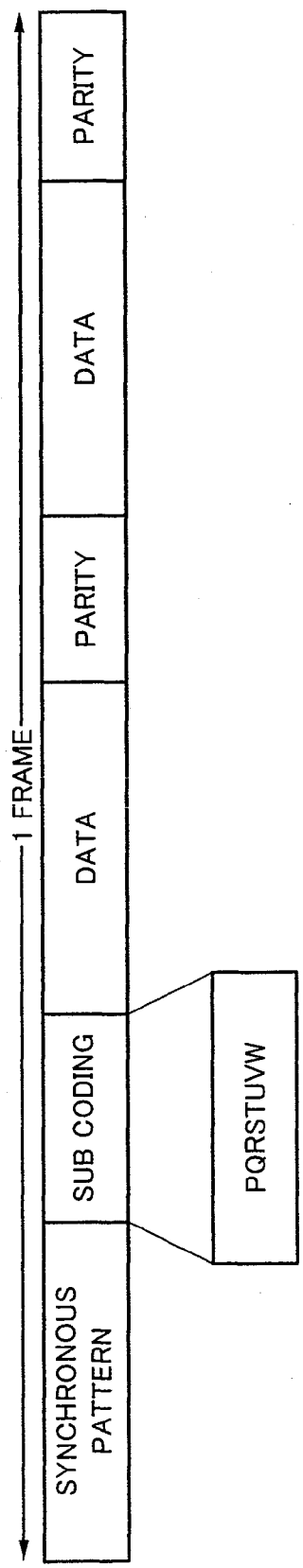
FIG. 4 is a schematic diagram showing an example of the structure of a frame of a CD.

FIG. 4 shows the structure of a frame of data generated by the EFM and CIRC decoding circuit 206 and supplied to the controller 207 shown in FIG. 3. As shown in FIG. 4, one frame is composed of a synchronous pattern portion (24 channel bits), a sub coding portion (one symbol, namely 14 channel bits), a first data portion (12 symbols, namely 12×14 channel bits), a first parity portion (4 symbols, namely 4×14 channel bits), a second data portion (12 symbols, namely 12×14 channel bits), and a second parity portion (four symbols, namely 4×14 channel bits). In this example, one frame contains three connection bits for connecting each symbol (assuming that a synchronous pattern is a symbol composed of 24 bits). Thus, the total number of connection bits are 34×3=102 channel bits. Consequently, one frame is composed of a total of 588 channel bits.

Figures 5, 6:
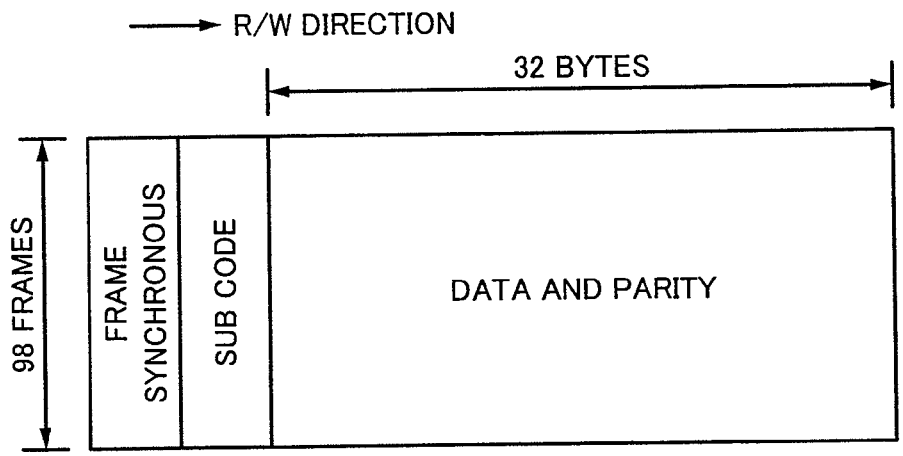
FIG. 5 is a schematic diagram showing an example of the structure of the format of a sub code of a CD.
FIG. 6 is a schematic diagram showing an example of the structure of a frame of a sub code of a CD.

As shown in FIG. 5, 98 frames form one block of information composed of frame synchronous information, sub code information, and data and parity information (this block of information is referred to as sub code frame). Sub code data of 98 frames represents sub code information of one block. Next, with reference to FIG. 6, such a block will be described. Sub codes of first frame F1 and second frame F2 are composed of fixed synchronous patterns S0=00100000000001 and S1=00000000010010, respectively. As S0 and S1, patterns which do not take place in an EFM modulation are used. Thus, when data is reproduced, with the fixed synchronous patterns S0 and S1, a start position of a block about sub code information is identified.

Sub codes of 96 frames of third frame F3, fourth frame F4, . . . , 97-th frame F97, and 98-th frame F98 are composed of P1, Q1, R1, S1, T1, U1, V1, and W1, P2 to W2, . . . , P95 to W95, and P96 to W96, respectively. Rows of P1, P2, . . . , and P96, Q1, Q2, . . . and Q96, R1 to R96, S1 to S96, T1 to T96, U1 to U96, V1 to V96, and W1 to W96 each form complete information channels.

Such sub code information contains (1) information with respect to such as music program start position detection and programming reproduction function and (2) additional information such as text information. As information (1), P channel and Q channel of sub codes are used. As information (2), R channel to W channel are used. P channel represents a pause between two music programs. P channel is used to coarsely detect the beginning of a music program. In contrast, Q channel is used to more finely control the detection of the music program start position.

Figure 7:
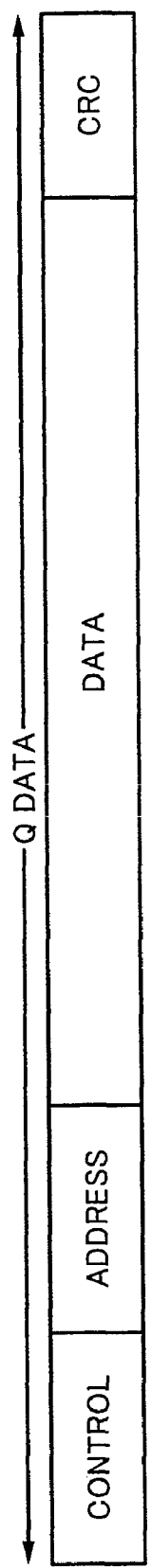
FIG. 7 is a schematic diagram showing an example of the structure of Q data of a sub code.
Figure 8:
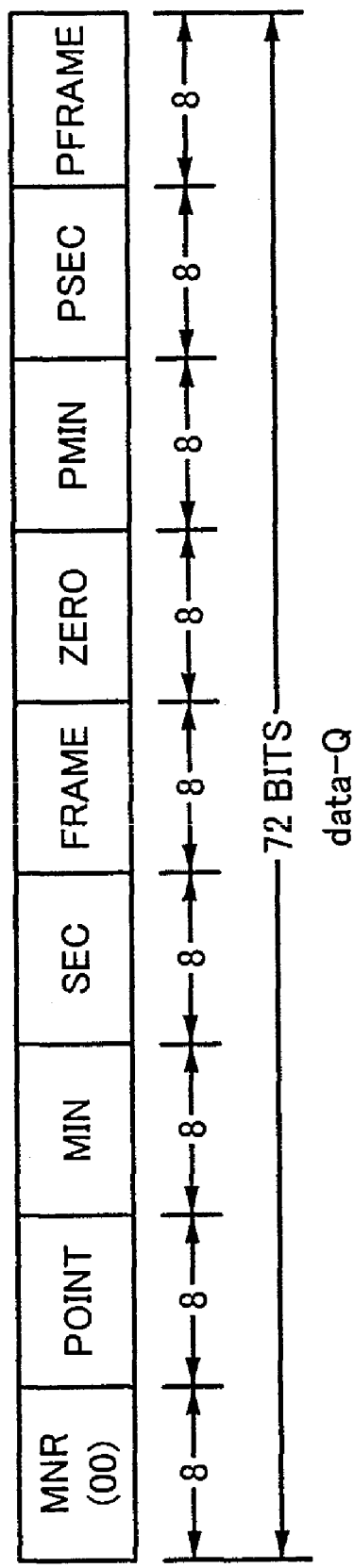
FIG. 8 is a schematic diagram showing an example of the structure of a data portion of Q data.

FIG. 7 shows an example of contents of Q data. As shown in FIG. 8, Q data is composed of a control portion, an address portion, a data portion, and a CRC (Cyclic Redundancy Code) portion.

The control portion is composed of four bits Q1 to Q4 in which data which identifies the number of audio channels, an emphasis, digital data, and so forth has been recorded.

The address portion is composed of four bits Q5 to Q8 in which a control signal which represents a data format and a data type of the data portion which will be described later has been recorded.

The CRC portion is composed of 16 bits Q81 to Q96 in which data for detecting an error with a cyclic code has been recorded.

Figure 9:
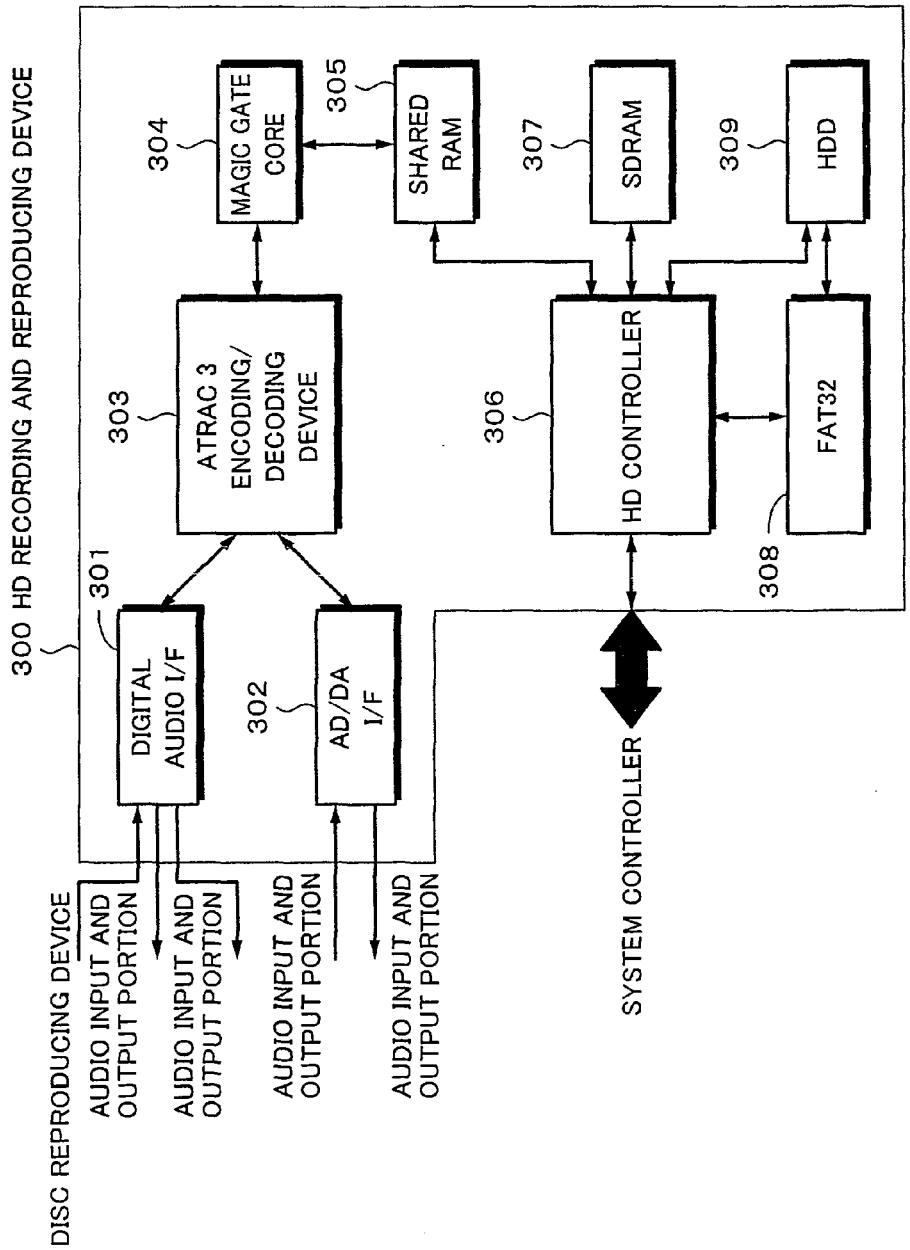
FIG. 9 is a block diagram showing an example of the structure of a HD recording and reproducing device according to the embodiment of the present invention.

As shown in FIG. 8, the data portion is composed of 72 bits Q9 to Q80. When the four-bit data of the address portion is "0001", the data portion (TOC (Table Of Contents)) of the lead-in area of the optical disc D has the structure shown in FIG. 9. In other words, as shown in FIG. 9, the data portion is composed of an MNR portion (music program number portion), a POINT portion, an MIN portion (elapsed time minute component portion), a SEC portion (elapsed time second component portion), a FRAME portion (elapsed time frame number portion), a ZERO portion, a PMIN portion (absolute time minute component portion), a PSEC (absolute time second component portion), and a PFRAME portion (absolute time frame number portion). Each of these portions is composed of eight-bit data.

Each of the MNR portion, the MIN portion, the SEC portion, the FRAME portion, and the ZERO portion are fixed to "00" in hexadecimal notation. Thus, all eight bits of each of these portions are "0".

When the POINT portion is "A0" in hexadecimal notation, the PMIN portion represents the first music program number or the first movement number. When the POINT portion is "A1" in hexadecimal notation, the PMIN portion represents the last music program number or the last movement number. When the POINT portion is "A2" in hexadecimal notation, the PMIN portion (absolute time minute component portion), the PSEC portion (absolute time second component portion), and the PFRAME portion (absolute time frame number portion) represent absolute time (PTIME) at which the lead-out area starts.

When the POINT portion is represented in two-digit BCD, the PMIN portion (absolute time minute component portion), the PSEC portion (absolute time second component portion), and the PFRAME portion (absolute time frame number portion) represent an address in absolute time (PTIME) at which a music program or a movement represented by their values starts.

In this example, the disc reproducing device 200 is a disc reproducing device which can load one optical disc. However, the disc reproducing device 200 may be a disc changer type reproducing device which can load a plurality of optical discs.

FIG. 9 is a block diagram showing the structure of the HD recording and reproducing device 300 according to the embodiment of the present invention. The HD recording and reproducing device 300 is a device which records and reproduces audio data and which records data and so forth for managing audio data.

As shown in FIG. 9, the HD recording and reproducing device 300 is composed of a digital audio interface (hereinafter referred to as digital audio I/F) 301, an AD/DA interface (hereinafter referred to as AD/DA I/F) 302, an encoding/decoding device 303, a magic gate core portion 304, a shared RAM (Random Access Memory) 305, a HD controller 306, an SDRAM (Synchronous Dynamic Random Access Memory) 307, an FAT (File Allocation Table) file system 308, and an HDD (Hard Disk Drive) 309.

The digital audio I/F 301 is an interface for a digital audio signal. The digital audio I/F 301 supplies a digital audio signal supplied from the EFM and CIRC decoding circuit 206 of the disc reproducing device 200 or a digital input terminal (which will be described later) of the audio input and output portion 400 to the encoding/decoding device 303. In addition, the digital audio I/F 301 supplies a digital signal supplied from the encoding/decoding device 303 to a digital output terminal (which will be described later) of the audio input and output portion 400.

The AD/DA I/F 302 supplies a digital audio signal supplied from an A/D converter (which will be described later) of the audio input and output portion 400 to the encoding/decoding device 303. In addition, the AD/DA I/F 302 supplies a digital audio signal supplied from the encoding/decoding device 303 to a DA converter 402 of the audio input and output portion 400.

The encoding/decoding device 303 compresses a digital audio signal supplied from the digital audio I/F 301 or the AD/DA I/F 302 corresponding to ATRAC3 (Adaptive Transform Acoustic Coding 3) as a data compressing system and supplies the compressed signal to the magic gate core portion 304. The data compressing system according to the present invention is not limited to ATRAC3. In other words, MP3 (MPEG-1 audio layer 3), WMA (Windows®) Media Audio), AAC (Advanced Audio Coding), or TwinVQ (Transform-domain Weighted Interleave Vector Quantization) may be used.

In addition, the encoding/decoding device 303 decompresses data which has been compressed corresponding to ATRAC3 and supplied from the magic gate core portion 304 and supplies the decompressed data to the digital audio I/F 301 and/or the AD/DA I/F 302.

The magic gate core portion 304 encrypts audio data supplied from the encoding/decoding device 303 and supplies the encrypted data to the shared RAM 305. The magic gate is a function for encrypting a content (music) and mutually authenticating devices so as to protect copyright of the content.

The shared RAM 305 stores digital audio data supplied from the magic gate core portion 304 and supplies the digital audio data to the HD controller 306. In addition, the shared RAM 305 stores digital audio data supplied from the HD controller 306 and supplies the digital audio data to the magic gate core portion 304.

The HD controller 306 is a microcomputer which controls each portion of the HD recording and reproducing device 300. For example, the HD controller 306 causes the encoding/decoding device 303 to start the ATRAC3 encode or ATRAC3 decode. In addition, the HD controller 306 causes the magic gate core portion 304 to start the encryption or decryption. The HD controller 306 and the HDD 309 are connected through an IDE (Integrated Device (Drive) Electronics) bus based on ATA (AT Attachment). Data is written and read through the bus using PIO (Programmable I/O) mode.

Whenever the magic gate core portion 304 encrypts one sound unit (for around 23.2 msec), the HD controller 306 is interrupted by the shared RAM 305. Whenever the HD controller 306 is interrupted, it transfers data stored in the shared RAM 305 to the SDRAM 307. The data is further transferred to the HDD 309 through the FAT 32 file system 308 and recorded as a music file to the HDD 309.

In addition, whenever the magic gate core portion 304 decrypts one sound unit, the HD controller 306 is interrupted by the shared RAM 305. Whenever the HD controller 306 is interrupted, it transfers the next sound unit from the SDRAM 307 to the shared RAM 305.

The SDRAM 307 stores audio digital data supplied from the HDD 309 or the shared RAM 305.

The FAT 32 file system 308 is a file system which is used whenever the HD controller 306 reads data from the HDD 309 or writes data to the HDD 309. The FAT 32 file system 308 is an essential system for managing data written to the HDD 309 as files. In this example, the FAT 32 file system 308 is represented as a block of the HD recording and reproducing device 300. In reality, the FAT 32 file system 308 is software attached to the HD controller 306. Unlike with other blocks, the HD controller 306 is not a physical block. According to the embodiment of the present invention, the FAT 32 file system 308 is used as a file system. Alternatively, VFAT32 file system may be used as a file system. Likewise, NTFS (NT File System), HFS (Hierarchical File System), or HFS Plus may be used as a file system.

Data recorded in the HDD 309 is managed as files by the FAT 32 file system 308. Likewise, audio data and music management information database which will be described later are managed as files by the FAT 32 file system 308. The FAT 32 file system 308 has system calls such as file open, file close, file read, and file write necessary for operating files.

The HDD 309 stores audio data and so forth. In reality, the HDD 309 stores an album number management file, a reproduction time management database file, an album/track name database file, a TOC database file, an album reproduction management file, a music file, a play list management file, and so forth. These files will be described later.

Figure 10:
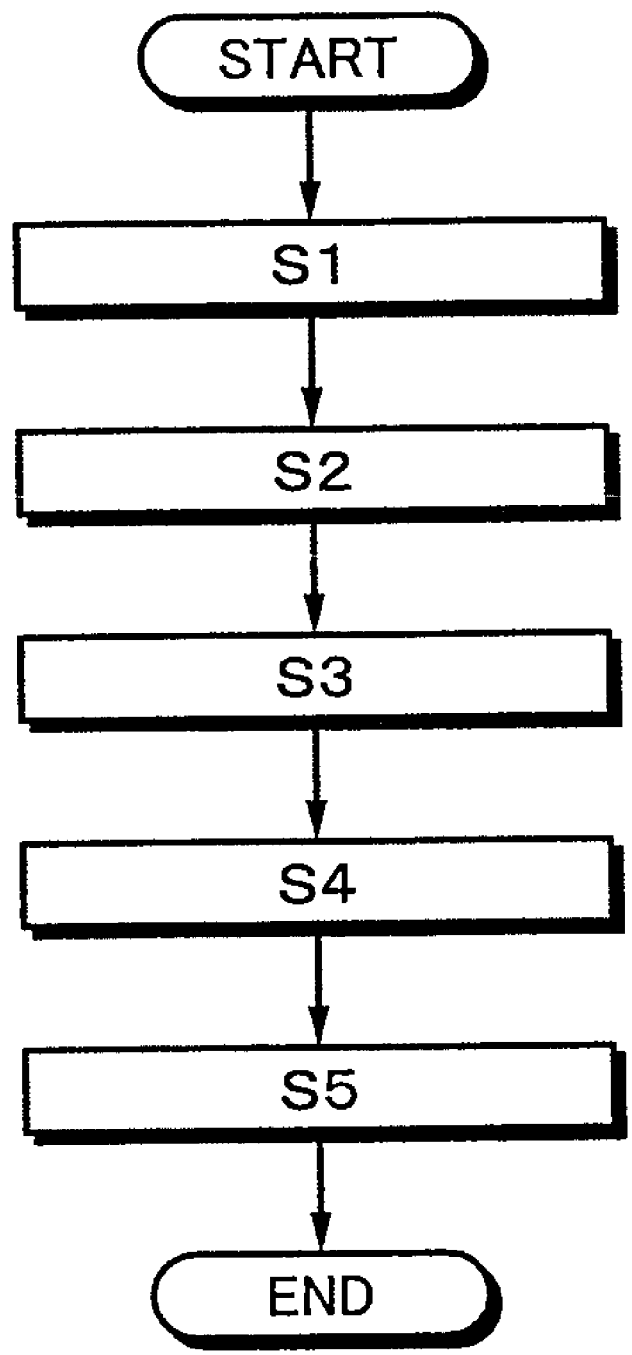
FIG. 10 is a flow chart for explaining a process for recording audio data to the HD recording and reproducing device according to the embodiment of the present invention.

FIG. 10 is a flow chart for explaining a process for recording audio data to the HD recording and reproducing device 300. When audio data is recorded to the HD recording and reproducing device 300 the HD controller 306 creates a file on the HDD 309 using the FAT 32 file system 308.

First of all, the HD controller 306 creates a new file on the HDD 309 using the FAT 32 file system 308 (at step S1).

Thereafter, the encoding/decoding device 303 compresses a digital audio signal supplied from the audio input and output portion 400 through the digital audio I/F 301 or the AD/DA I/F 302 under the control of the HD controller 306. The encoding/decoding device 303 compresses the digital audio signal corresponding to ATRAC3 compression coding technology in such a manner that the digital audio signal is compressed in high quality and with high efficiency. The compressed signal is supplied to the magic gate core portion 304 (at step S2).

Thereafter, the magic gate core portion 304 encrypts audio data which has been compressed corresponding to ATRAC3 under the control of the HD controller 306 and supplies the encrypted data to the shared RAM 305 (at step S3).

Whenever the magic gate core portion 304 encrypts one sound unit, the HD controller 306 transfers data stored in the shared RAM 305 to the SDRAM 307 (at step S4). Thereafter, the data is transferred to the HDD 309 through the FAT 32 file system 308 and recorded as a file to the HDD 309 (at step S5).

When audio data which corresponds to IEC 60958 and whose category is CD is recorded, by analyzing C bit and U bit of the audio data, the HD recording and reproducing device 300 can record the audio data on the HDD 309 in the order of programs of the CD.

Figure 11:
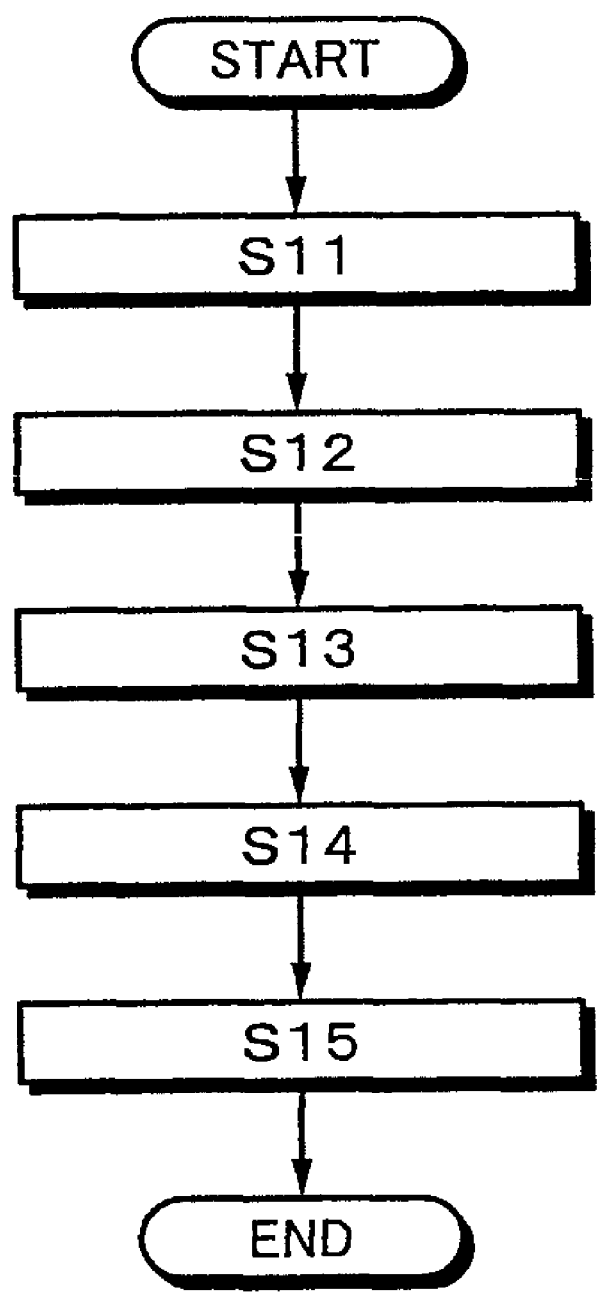
FIG. 11 is a flow chart for explaining a process for recording audio data to the HD recording and reproducing device according to the embodiment of the present invention.

FIG. 11 is a flow chart for explaining a process for recording audio data to the HD recording and reproducing device 300. When audio data is reproduced by the HD recording and reproducing device 300, the HD controller 306 opens music files recorded on the HDD 309 and reads data therefrom.

First of all, the HD controller 306 opens user's desired file using the FAT 32 file system 308 (at step S11) and reads the opened file from the HDD 309 to the SDRAM 307 (at step S12).

Thereafter, wherever the magic gate core portion 304 decrypts one sound unit, the HD controller 306 transfers one sound unit from the SDRAM 307 to the shared RAM 305 (at step S13).

Thereafter, the magic gate core portion 304 decrypts audio data supplied from the HD controller 306 through the shared RAM 305 and supplies the decrypted audio data to the encoding/decoding device 303 (at step S14).

Thereafter, the encoding/decoding device 303 decompresses audio data supplied from the magic gate core portion 304 and supplies the decompressed audio data to the audio input and output portion 400 through the digital audio I/F 301 or the AD/DA I/F 302 (at step S15).

The HD recording and reproducing device 300 according to the embodiment of the present invention provides 500 files called albums which group a plurality of music programs (tracks). In addition, the HD recording and reproducing device 300 provides 10 files called play lists which collect any tracks recorded on the HDD 309. An album is a file which stores recorded music programs, whereas a play list is a file linked to music programs (tracks) which an album stores, namely, not a file which stores entities of music files.

The number of files which can be recorded in one album is 400 (music programs). This limit applies to a play list. Thus, the HD recording and reproducing device 300 can store up to 200,000 music programs (500 albums×400 tracks). However, in the dubbing apparatus of which the disc reproducing device 200 and the HD recording and reproducing device 300 are integrated, the number of music program which can be reproduced and recorded is limited to 20,000 so that they can be comfortably reproduced and recorded.

Figure 12:
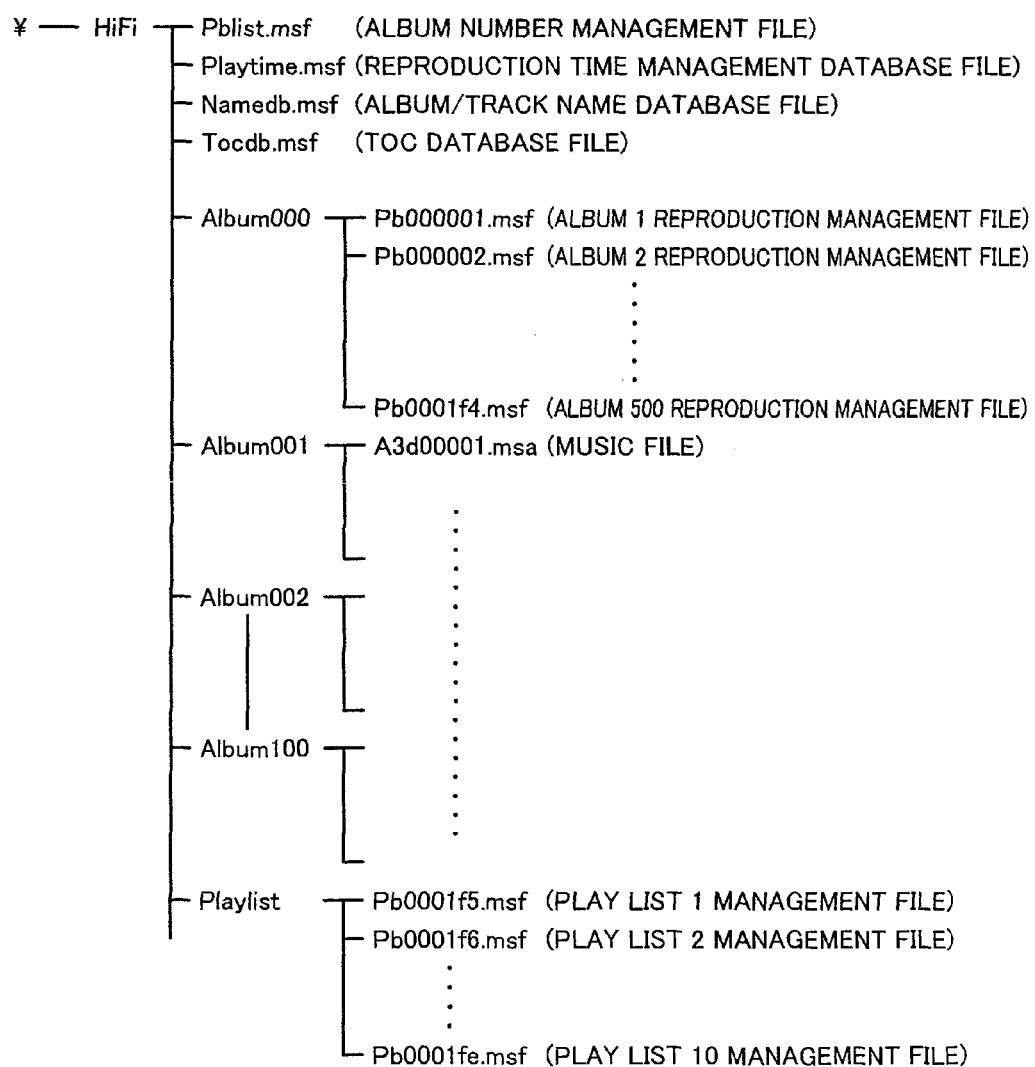
FIG. 12 is a tree chart showing the structure of files stored in an HDD.

FIG. 12 is a tree chart showing the structure of files stored in the HDD 309. Music files and database files for managing music files are stored under HiFi directory which is stored under a root directory. Under HiFi directory, album number management file Pblist.msf referred to as album playback list (hereinafter simply abbreviated as Pblist) (16 kB) which represents the reproduction order of 500 albums. In Pblist, file numbers of reproduction management files of 500 albums are described. In addition to Pblist, under HiFi directory, album/track name database file Namedb.msf which is a database of album names, track names, and artist names of all albums and all tracks (hereinafter this database is abbreviated as Namedb), reproduction time management database file Playtime.msf which is a database of reproduction times of all tracks (hereinafter this database is abbreviated as Playtime), and TOC database file Tocdb.msf which stores TOC of an optical disc for a synchronous recording with the disc reproducing device 200 and assigns a name to an album or a track using a service such as CDDB (Compact Disc Data Base) (hereinafter this file is abbreviated as Tocdb) are stored. Directory Album000 stored under HiFi directory stores album reproduction management files Pb000001.msf to Pb0001f4.msf (abbreviated as Pb000000) referred to as playback lists which store data such as the total number of tracks, an album name, a program reproduction order, an album highlight of each of 500 albums.

100 directories Album001 to Album100 stored under HiFi directory store recorded music files. Since up to 20,000 music files can be created, if they are stored in the same directory, the FAT 32 file system 308 takes a long time to search for the location of a designated file. To shorten the search time, it is effective to distribute those music files to many directories. Because of such a reason, recorded music files have been distributed to 100 directories Album001 to Album100. Each music file is assigned file name A3dxxxxx.msa (hereinafter abbreviated as A3dxxxxx). Sequence numbers are assigned from the first track to max. 20,000-th tracks.

The last directory stored under HiFi directory is Playlist directory which stores play list management files Pb0001f5 to Pb0001fe which accomplish the forgoing play list function.

FIG. 13 shows the structure of album number management file Pblist. FIGS. 14A and 14B show a header and other portions which compose album number management file Pblist, respectively. Album number management file Pblist has a size of one cluster (one block=16 kB). The header shown in FIG. 14A is composed of 32 bytes. In the other portions (non-header portions) shown in FIG. 14B, table Alb-nnn for managing the reproduction order of albums and a part of information of the header are recorded. Positions of the beginnings of these different data portions in the reproduction management file have been defined.

As shown in FIG. 14A, the first 32 bytes (0x0000) and (0x0010) of the album number management file is the header. A unit of 16 bytes delimited from the beginning of the file is referred to as slot. The header in the first and second slots of the file contains data portions which have the following meanings, functions, and values. A data portion denoted by "Reserved" represents an undefined data portion. Null (0x00) is normally written to a reserved data portion. However, any data described in a reserved data portion is ignored. In a future version, a reserved data portion may be changed. No data is permitted to be written to a reserved data portion.

BLKID-TL0 (Four Bytes)
 Meaning: BLOCKID FILE ID
 Function: A value for identifying the beginning of the album number management file.
 Value: Fixed value="TL=0" (for example, 0x544C2D30)
Revision (Four Bytes)
 Meaning: The number of times of which Pblist has been rewritten
 Function: Increments the value whenever the album number management file is rewritten.
 Value: Starts with 0 and increments by +1.
T-ABLE (Two Bytes)
 Meaning: TOTAL NUMBER OF TRACKS
 Function: Total number of albums
 Value: 1 to 512 (including play lists). When there is no data, the value is all zeros.
Alb-nnn
 Meaning: SQN (Sequence) number of an album which is reproduced
 Function: Describes a file number of each album reproduction management file Pbxxxxxx.msf.
 Value: 1 to 512. When there is no data, the value is all zeros.

Figure 15:
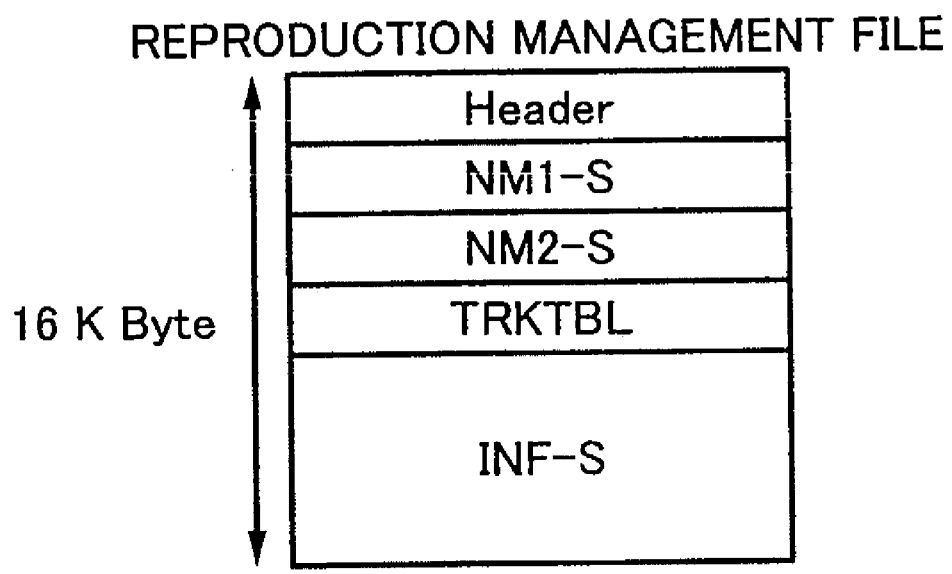
FIG. 15 is a schematic diagram showing the structure of album reproduction management file Pbxxxxxx.msf.

FIG. 15 shows the structure of the album reproduction management file. FIG. 16 shows the structure of an ATRAC3 data file of one file (music program). The album reproduction management file is a file having a 16 kB fixed length. An ATRAC3 data file is created in the unit of a music program and is composed of an attribute header and encrypted audio data which are stored in the order. The attribute header also has a 16 kB fixed length. The attribute header has a structure similar to the album reproduction management file.

The album reproduction management file shown in FIG. 15 is composed of a header, area NM1-S for storing an album name of a one-byte character string, area NM2-S for storing an album name of a two-byte character string, reproduction program order table TRKTBL, and additional information INF-S. The attribute header shown in FIG. 16 at the beginning of a data file is composed of a header, music program name NM1 of a one-byte code, music program name MN2 of a two-byte code, track information TRAKINF such as key information of the track, part information PRTINF, and additional information INF of the track. The header contains the total number of parts, an attribute of a name, and information such as a size of additional information.

The attribute header is followed by ATRAC3 audio data which is divided into 16-kB blocks. A header is placed at the beginning of each block. Each header contains an initial value with which encrypted data is decrypted. Only audio data of an ATRAC3 data file has been encrypted. The other data such as the reproduction management file and header have not been encrypted.

Next, with reference to FIG. 16, the relation between a music program and an ATRAC3 data file will be described. One track means one music program. One music program is composed of one ATRAC3 data file (see FIG. 16). An ATRAC3 data file is audio data which has been compressed corresponding to ATRAC3. Audio data is recorded as clusters to the HDD 309. One cluster has a capacity of for example 16 kB. One cluster does not contain a plurality of files.

One music program is basically composed of one part. However, when a music program has been edited, it may be composed of a plurality of parts. A part means a unit of data recorded in a successive time period after the start of the recording until the stop of the recording. Normally, one track is composed of one part. The sequence of parts of each music program is managed with part information PRTINF of the attribute header of the music program. In other words, the part size is represented with part size PRTSIZE which is four-byte data in PRTINF. The first two bytes of part size PRTSIZE represents the total number of clusters of the part. The other two bytes represent the location of the beginning sound unit (hereinafter abbreviated as SU) and the location of the last SU of the beginning cluster and the last cluster, respectively. With such a part notation, audio data can be edited without need to move a large amount of audio data. When audio data is edited in the unit of a block, the audio data can be prevented from being largely moved. However, one block is much larger than one SU as an editing unit.

One SU is the minimum unit of a part. In addition, one SU is the minimum data unit of audio data which is compressed corresponding to ATRAC3. When audio data of 1024 samples (1024×16 bits×2 channels) obtained at a sampling frequency of 44.1 kHz is compressed at a compression rate of 10, data of several hundred bytes is obtained. This data is one SU. One SU is equivalent to a time period of around 23 msec. Normally, one part is composed of several thousand SUs. When one cluster is composed of 42 SUs, one cluster represents a sound for one second. The number of parts which compose one track depends on the size of additional information. The number of parts depends on the header, music program name, and data of additional information, and so forth contained in one block. Thus, when one block does not contain additional information, a maximum number of parts (645 parts) can be used.

Figure 17A:
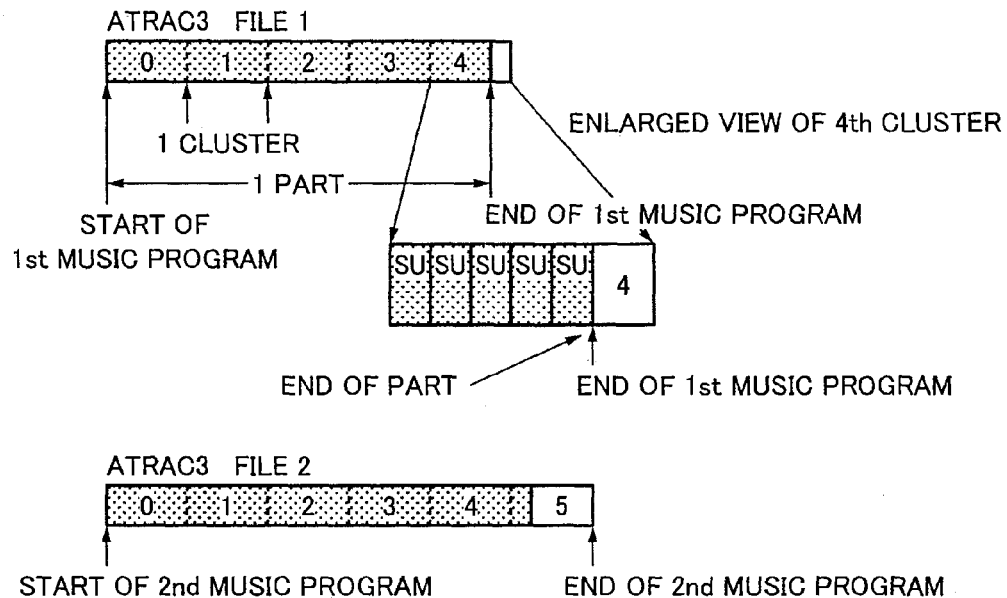
FIG. 17A is a schematic diagram for explaining a combine editing process and a divide editing process according to the present invention in the case that two programs of audio data are successively recorded.

FIG. 17A shows the structure of files in the case that audio data of two music programs are successively recorded from a CD. Referring to FIG. 17A, a first music program (file 1) is composed of for example five clusters. Since one cluster cannot contain two files, file 2 is created from the beginning of the next cluster. Thus, the end of part 1 corresponding to file 1 (the end of the first music program) is in the middle of a cluster. No data is present in the remaining portion of the cluster. Likewise, the second music program (file 2) is composed of one part. In the case of file 1, the part size is 5, SU of the beginning cluster is 0, and the end cluster is 4.

There are six types of track editing operations which are track dividing operation, track combining operation, track erasing operation, track moving operation, track name assigning operation, and track artist name assigning operation. When the track dividing operation is performed, one track is divided into two portions. When one track is divided, the total number of tracks is increased by 1. When the track dividing operation is performed, one file is divided into two portions on the file system and the reproduction management file and FAT are updated. When the track combining operation is performed, two tracks are combined to one track. When two tracks are combined to one track, the total number of tracks is decreased by one. When the track combining operation is performed, two files are combined to one file on the file system and the reproduction management file and FAT are updated. When the track erasing operation is performed, a track is erased. When the track erasing operation is performed, the track numbers of tracks after the erased track are decreased by one each. When the track moving operation is performed, the order of tracks is changed. When each of the track erasing operation and the track moving operation is performed, the reproduction management file and FAT are updated. When the track name assign operation is performed, a track name is assigned to a track. When the track artist name assigning operation is performed, an artist name is assigned to a track.

Figure 17B:
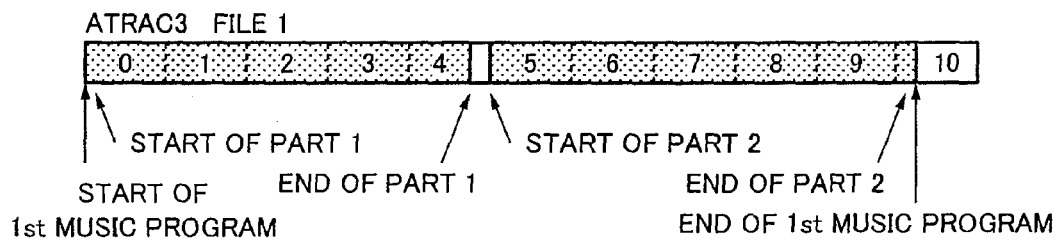
FIG. 17B is a schematic diagram showing a combined result of two music programs by the combine editing process according to the present invention.
Figure 17C:
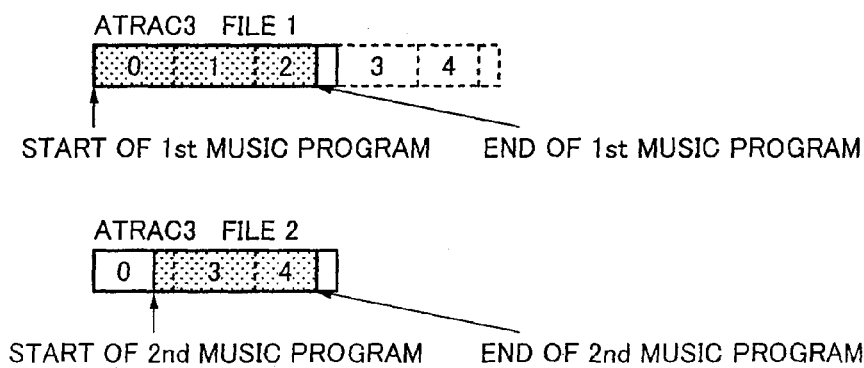
FIG. 17C is a schematic diagram showing a divided result as two music programs by the divide editing process according to the present invention.

FIG. 17B shows a combined result of which two music programs (file 1 and file 2) shown in FIG. 17A are combined. When the two music programs are combined, one file is created. The file is composed of two parts. FIG. 17C shows a divided result of which one music program (file 1) is divided in the middle of cluster 2. When the music program is divided, file 1 which is composed of clusters 0 and 1 and a beginning portion of cluster 2 and file 2 which is composed of a last portion of cluster 2 and clusters 3 an 4 are created.

As was described above, according to the embodiment of the present invention, since the part describing method can be used, in the combined result shown in FIG. 17B, the start position of part 1, the end position of part 1, the start position of part 2, and the end position of part 2 can be defined in the unit of one SU. As a result, it is not necessary to fill in a space as the combined result with audio data of part 2 which is moved. Likewise, since the part describing method can be used, it is not necessary to fill in a space at the beginning of file 2 as the combined result with data which is moved.

In addition, as album editing operations, album erasing operation, album moving operation, album name assigning operation, album artist name assigning operation, and so forth have been defined. When the album erasing operation is performed, an album is erased. When an album is erased, the album numbers of albums after the erased album are deceased by 1. When the album moving operation is performed, the order of albums is changed. When each of the album erasing operation and the album moving process is performed, the album number management file and FAT are updated. When the album name assigning operation is performed, an album name is assigned to an album. When the album artist name assigning operation is performed, an album artist name is assigned to an album.

FIG. 18 shows detailed data structure of the album reproduction management file. FIGS. 19A and 19B show a header and other portions which compose the album reproduction management file, respectively. The album reproduction management file has a size of one cluster (one block=16 kB). The header shown in FIG. 19A is composed of 32 bytes. The other portions (non-header portions) shown in FIG. 12B contain name NM1-S (256 bytes), name NM2-S (512 bytes), CONTENTSKEY, C_MAC[0], S-YMDhms, table TRKTBL (800 bytes) for managing the reproduction order of music programs, additional information INF-S (14720 bytes), and data portions of the header (redundant data portions of the header). Positions of the beginnings of these different data portions in the reproduction management file have been defined.

As shown in FIG. 19A, the first 32 bytes (0x0000) and (0x0010) of the album number management file is the header. A unit of 16 bytes delimited from the beginning of the file is referred to as slot. The header in the first and second slots of the file contains data portions which have the following meanings, functions, and values. A data portion denoted by "Reserved" represents an undefined data portion. Null (0x00) is normally written to a reserved data portion. However, any data described in a reserved data portion is ignored. In a future version, a reserved data portion may be changed. No data is permitted to be written to a reserved data portion. A data portion denoted by Option is treated in the same manner as a data portion denoted by Reserved.

BLKID-TL0 (Four Bytes)
   Meaning: BLOCKED FILE ID
   Function: A value for identifying the beginning of the album reproduction management file.
   Value: Fixed value="TL=0" (for example, 0x544C2D30)

MCode (Two Bytes)
   Meaning: MAKER CODE
   Function: A code for identifying a maker and a model of a device which has recorded the file.

Value: High order 10 bits (maker code), low order six bits (model code)

Revision (Four Bytes)

Meaning: The number of times of which the album reproduction management file has been rewritten Function: Increments the value whenever the album reproduction management file is rewritten Value: Starts with 0 and increments by +1.

SN1C+L (Two Bytes)

Meaning: Represents an attribute of a title (one byte) of an album written in NM1-S area.

Function: Represents a character code and a language code for use, one byte each.

Value: High order one byte=character code (C), identifying characters as follows:

00: No character code is set, but simply treated as a binary number

01: ASCII (American Standard Code for Information Interchange)

02: ASCII+KANA 03: Modified 8859-1

81: MS-JIS 82: KS C 5601-1989

83: GB (Great Britain) 2312-80

90: S-JIS (Japanese Industrial Standards) (for voice)

Low order one byte language code (L), identifying languages corresponding to EBU Tech 3258 standards as follows:

| 00: | Not set | 08: | German | 09: | English |
|---|---|---|---|---|---|
| 0A: | Spanish | 0F: | French | 15: | Italian |
| 1D: | Dutch | 65: | Korean | 69: | Japanese |
| 75: | Chinese | | | | |

When there is no data, all zeros should be set.

SN2C+1 (Two Bytes)

Meaning: Represents an attribute of a title (two bytes) of an album written in NM2-S area.

Function: Represents a character code and a language code for use, one byte each.

Value: Same as SN1C+L.

SINFSIZE (Two Bytes)

Meaning: Represents the total size of all data portions of additional information written in INF-S area.

Function: Describes data size in the unit of 16 bytes. When there is no data, all zeros should be set.

Value: Size ranging from 0x0001 to 0x39C (924).

T-TRK (Two Bytes)

Meaning: TOTAL NUMBER OF TRACKS

Function: Represents the total number of tracks.

Value: 1 to 0x0190 (max. 400 tracks). When there is no data, all zeros should be set.

Next, data groups (see FIG. 19B) preceded by the header will be described.

NM1-S

Meaning: An area for storing an album name of a one-byte character string.

Function: Variable length name data represented with a one-byte character code (max. 256)

Name data should be terminated with end code (0x00). The size should be calculated from the end code. When there is no data, null (0x00) should be recoded for at least one byte from the beginning (0x0020).

Value: Various types of character codes.

NM2-S

Meaning: An area for storing an album name of two-byte character string

Function: Variable length name data represented with a two-byte character code (max. 512).

The name data should be terminated with end code (0x00). The size should be calculated from the end code. When there is no data, null (0x00) should be recorded for at least two bytes from the beginning (0x0120).

Value: Various types of character codes

Contents Key

Meaning: Value assigned for each music program. After the value of CONTENTS KEY is protected with MG (R), the value is stored. Same as CONTENTS KEY assigned to the first music program.

Function: A key necessary for calculating MAC of S-YM-Dhms.

Value: 0 to 0xFFFFFFFFFFFFFFFF

MAC

Meaning: Copyright falsification check value.

Function: A value created with the content of S-YMDhms and CONTENTS KEY.

Value: 0 to 0xFFFFFFFFFFFFFFFF.

TRK-nnn

Meaning: SQN (Sequence) number of ATRAC3 data file which is reproduced.

Function: Describes FNo of TRKINF.

Value: 1 to 400 (0x190).

When there is no track, all zeros should be set.

INF-S

Meaning: Album additional information (additional information for example an artist name and so forth)

Function: Variable length additional information data having a header.

A plurality of types of additional information groups may be described. Each of them is assigned an ID and a data size. Each additional information data portion containing a header is composed of at least 16 bytes which is a multiple of four bytes. The details will be described later.

Value: see data structure of additional information.

S-YMDhms (Four Bytes) (Option)

Meaning: Year, month, day, hour, minute, and second recorded by a device which has a reliable clock.

Function: A value for identifying the last record date and time. This data portion is essential in EMD.

Value: Bits 25 to 31=year 0 to 99 (1980 to 2079)

Bits 21 to 24=month 0 to 12

Bits 16 to 20=day 0 to 31

Bits 11 to 15=hour 0 to 23

Bits 05 to 10=minute 0 to 59

Bits 00 to 04=second 0 to 29 (unit of two bits)

In the last slot of the album reproduction management file, BLKID-TL0, MCode, and REVISION which are the same as those of the header are stored.

When a commercial audio device is used, while data is being written to a memory card, it may be removed from the device or the power thereof may be turned off. Thus, after the audio device has recovered from such a state, the device should detect an occurrence thereof. To do that, as was described above % REVISION is written at the beginning and end of each block. Whenever the value of this data portion is rewritten, it is incremented by +1. If an abnormal termination takes place in the middle of one block, since the value of REVISION at the beginning of the block does not match that at the end of the block, the device can detect an occurrence of the abnormal termination. Since there are two data portions of REVISION, the device can detect an occurrence of the abnormal termination with high probability. When the device has detected an occurrence of the abnormal termination, the device generates an alarm such as an error message.

In addition, since fixed value BLKID-TL has been inserted into a beginning portion of one block (16 kB), if FAT of the HDD 309 has been destroyed, files can be restored with the fixed value. In other words, with the fixed value at the beginning of each block, the type of the file can be identified. In addition, fixed value BLKID-TL0 has been dually described in the header and the end portion of the block. Thus, the reliability of the block can be checked. Alternatively the same album reproduction management file may be dually recorded.

The data amount of a ATRAC3 data file is remarkably larger than that of the track information management file. As will be described later, block number BLOCK SERIAL is assigned to an ATRAC3 data file. However, since a plurality of ATRAC3 data files are present in the HDD 309, they should be identified with CONNUM0 and then assigned BLOCK SERIAL. Otherwise, ATRAC3 data files may not be uniquely identified. Thus, if FAT has been destroyed, it is difficult to restore files. In other words, one ATRAC3 data file may be composed of a plurality of blocks and distributed. Thus, to identify blocks which compose the same ATRAC3 data file, CONNUM0 is used. In addition, the ascending/descending order of the blocks of the same ATRAC3 data file is represented with block number BLOCK SERIAL.

Likewise, maker code (MCode) has been recorded at the beginning and end of each block so that a maker and a model of a device which has recorded the file can be identified when the file is improper due to an incorrect logic although FAT has not been destroyed.

FIG. 19C shows the data structure of additional information. The following header is written at the beginning of additional information. The header is following by variable length data portions.

INF
    Meaning: FIELD ID
    Function: A fixed value representing the beginning of data of additional information.
    Value: 0x69
ID
    Meaning: Key code of additional information
    Function: Represents a category of additional information.
    Value: 0 to 0xFF.
Size
    Meaning: Size of individual additional information portion
    Function: Free data size, but a multiple of four bytes. Min. 16 bytes. The last space of SIZE should be filled with null (0x00).
    Value: 16 to 14784 (0x39C0)
MCode
    Meaning: MAKER CODE
    Function: A code for identifying a maker and a model of a device which has recorded the file.
    Value: High order 10 bits (maker code); low order six bits (model code).
C+L
    Meaning: Represents an attribute of characters written in a data area which starts with 12-th byte.
    Function: Represents a character code and a language code for use, one byte each.
    Value: Same as SNC+L.
Data
    Meaning: Individual data of additional information
    Function: Represents variable length data. The beginning of entity data always starts with 12-th byte. The length (size) of DATA is min. four bytes, but a multiple of four bytes. A last space of DATA should be filled with null (0x00).
    Value: Individually defined depending on contents.

FIG. 20 shows a data arrangement of ATRAC3 data file A3Dnnnn in the case that one SU is composed of N bytes (for example N=384 bytes). FIG. 20 shows an attribute header (one block) of a data file and an audio data file (one block). FIG. 20 shows beginning bytes (0x0000 to 0x7FF0) of slots of two blocks (16×2=32 kbytes). FIG. 21 is an enlarged view showing the attribute header. As shown in FIG. 21, the first 32 bytes of the attribute header is a header portion. 256 bytes of the attribute header is music program name area NM1(256 bytes). 512 bytes of the attribute header is music program name area NM2 (512 bytes). The following data portions are contained in the header portion of the attribute header.

BLKID-HD0 (Four Bytes)
    Meaning: BLOCKID FIELD ID
    Function: A value for identifying the beginning of a ATRAC3 data file.
    Value: Fixed value="HD=0" (for example, 0x48442D30).
MCode (Two Bytes)
    Meaning: MAKER CODE
    Function: A code for identifying a maker and a model of a device which has recoded the file.
    Value: High order 10 bits (maker code); low order six bits (model code)
Block Serial (Four Bytes)
    Meaning: Serial number assigned for each track.
    Function: The value of BLOCK SERIAL starts with 0 and increments by +1. Even if the track is edited, the value of BLOCK SERIAL is not changed.
    Value: 0 to 0xFFFFFFFF
N1C+L (Two Bytes)
    Meaning: Represents an attribute of data (MN1) of the track.
    Function: Represents a character code and a language code used in NM1, one byte each.
    Value: Same as SN1C+L.
N2C+L (Two Bytes)
    Meaning: Represents an attribute of data (NM2) of the track (music program name).
    Function: Represents a character code and a language code for NM2, one byte each.
    Value: Same as SN1C+L.
INFSIZE (Two Bytes)
    Meaning: Represents the total size of all data portions of additional information about the track.
    Function: Describes data size with a multiple of 16 bytes. When there is no data, all zeros should be set.
    Value: Size ranging from 0x0000 to 0x3C6 (966).
T-PRT (Two Bytes)
    Meaning: total number of parts
    Function: Represents the total number of parts which composes the track. Normally, the value of T-PRT is 1.
    Value: 1 to 0x285 (645 dec)
T-SU (Four Bytes)
    Meaning: Total number of SUs
    Function: Represents the total number of SUs in one track and is equivalent to a play time of one music program.
    Value: 0x01 to 0x001FFFFF.
INX (Two Bytes) (Option)
    Meaning: Relative location of INDEX.
    Function: A pointer which represents the beginning of a featured portion of a music program. Designates the position of the featured portion from the beginning of the music program with a value of which the number of SUs is divided by 4. The value of INX is equivalent to a time period for the length of which the number of SUs is multiplied by four (around 93 msec).
    Value: 0 to 0xFFFF (max. around 6084 sec).

XT (Two Bytes) (Option)
  Meaning: Reproduction time period of INDEX
  Function: Designates a time period from the beginning designated by INX-nnn with a value of which the number of SUs is divided by 4. The value of XT is equivalent to a time period for the length of which the number of SUs is multiplied by 4 (around 93 msec).
  Value: 0x0000: Not set 0x01 to 0xFFFE (max. 6084 sec). 0xFFFF: Up to the end of the music program.

Next, music program name areas NM1 and NM2 will be described.
NM1
  Meaning: Character string which represents a music program name
  Function: Variable length music program name represented with a one-byte character code (max. 256). The name data should be terminated with end code (0x00) The size should be calculated from the end code. When there is no data, null (0x00) should be recorded for at least one byte from the beginning (0x0020).
  Value: various types of character codes.
NM2
  Meaning: Character string which represents a music program name.
  Function: variable length name data represented with a two-byte character code (max. 5120. The name data should be terminated with end code (0x00). The size should be calculated from the end code. When there is no data, null (0x00) should be recorded for at least two bytes from the beginning (0x0120).
  Value: Various types of character codes Data of 80 bytes started from the fixed position (0x320) of the attribute header is called track information area TRKINF. In the area, information with respect to security and copy control is totally managed. FIG. 22 shows a data group of TRKINF. Next, the data group of TRKINF will be successively described.

Contents Key (Eight Bytes)
  Meaning: Value assigned for each music program. After the value of CONTENTS KEY is protected with MG (R), the value is stored.
  Function: A key which is initially required when a music program is reproduced. The value of CONTENTS KEY is used when MAC is calculated.
  Value: 0 to 0xFFFFFFFFFFFFFFFF
C_MAX[0] (Eight Bytes)
  Meaning: Copyright information falsification check value
WM
  Meaning: Water Mark
  Function: Represents a water mark state of a content.
A (on Byte)
  Meaning: Attribute of a part
  Function: Represents information such as compression mode of a part.
  Value: Next, the value of A will be described with reference to FIG. 23.

When N of bits 6, 5, and 4=0 or 1 (monaural) and bit 7=1, a special joint mode is defined as monaural with sub signal=0 and main signal=(L+R). A regular player (reproducing device) can ignore information of bits 2 and 1.

Bit 0 of A represents information about emphasis on/off. Bit 1 of A represents information about reproduction skip or normal reproduction. Bit 2 of A represents information about data type for example audio data or other type data such as FAX. Bit 3 of A is undefined. As shown in FIG. 23, bits 4, 5, and 6 defines information about ATRAC3 mode. In other words, N is a three-bit value representing five modes about record time period, data transfer rate, and number of SUs per block. These modes are monaural (N=0, 1), LP (N=2), SP (N=4), EX (N=5), and HQ (N=7). The number of bytes of one SU is (monaural: 136 bytes, LP: 192 bytes, SP: 304 bytes, EX: 384 bytes, HQ: 512 bytes). Bit 7 of A represents a mode about ATRAC3 (0: Dual, 1: Joint).

LT (One Byte)
  Meaning: Reproduction restriction flag (bit 7 and bit 6) and security version (bit 5 to bit 0).
  Function: Represents a restriction item with respect to the current track.
  Value:
    bit 7: 0=not restricted, 1=restricted
    bit 6: 0=not expired, 1=expired
    bit 5 to bit 0: security version 0 (Unless the security version is 0, the track is prohibited from being reproduced.)
FNo (Two Bytes)
  Meaning: File number
  Function: A track number of a file which has been recorded at first. The value of FNo identifies the location of a value which is used for calculating MAC and which is recorded in a hidden area of a memory card.
  Value: 1 to 0x90 (400)
MG (D) SERIAL-nnn (16 Bytes)
  Meaning: Serial number of a security block (security IC 20) of a recording device
  Function: A unique value assigned to each recording device.
  Value: 0 to 0xFFFFFFFFFFFFFFFFFFFFFFFFFFFFFFFF
CONNUM (Four Bytes)
  Meaning: Content cumulative number.
  Function: A unique value cumulated for each music program. This value is managed by a security block of a recording device. $2^{32}$, which is 420,000,000, recorded music programs can be identified.
  Value: 0 to 0xFFFFFFFF
YMDhms-S (Four Bytes) (Option)
  Meaning: Reproduction start date and time of a track which has been reproduction restricted.
  Function: Date and time on and at which reproduction start designated by EMD is permitted.
  Value: Same as the forgoing notation for date and time.
YMDhms-E (Four Bytes) (Option)
  Meaning: Reproduction end date and time of a track which has been reproduction restricted
  Function: Date and time on and at which reproduction permission designated by EMD is expired.
  Value: Same as the forgoing notation for date and time.
MT (One Byte) (Option)
  Meaning: Maximum value of the permitted number of times of a reproducing operation
  Function: The maximum number of times of the reproducing operation designated by EMD
  Value: 0 to 0xFF. When MT is not used, 0x00 is set. When the value of bit 7 of LT is 0, 00 should be set.
CT (One Byte) (Option)
  Meaning: Number of times of a reproducing operation
  Function: The number of times of which a reproducing operation can be actually performed in the permitted number of times of a reproducing operation. The value of CT is decremented whenever a reproducing operation is performed.
  Value: 0x00 to 0xFF. When CT is not used, 0x00 is set. When bit 7 of LT is 1 and the value of CT is 00, the reproducing operation should be prohibited.

CC (One Byte)
  Meaning: COPY CONTROL
  Function: Controls a copying operation.
  Value: Next, the value of CC will be described with reference to FIG. 24. Bits 6 and 7 of CC represent copy control information. Bits 4 and 5 of CC represent copy control information with respect to a high speed digital copy. Bits 2 and 3 of CC represent an authentication level of a security block. Bits 0 and 1 of CC are undefined. Examples of the value of CC:
(bits 7 and 6) 11: permits an unrestricted copy; 01: prohibits a copy; 00: permits a copy one time.
(bits 3 and 2) 00: records a file from analog/digital-in. MG authentication level is 0. When a file is digitally recorded from a CD, (bits 7 and 6) is 00 and (bits 3 and 2) is 00.
CN (One Byte) (Option)
  Meaning: Permitted number of times of a copying operation in a high speed digital copy HSCMS
(High Speed Serial Copy Management System)
  Function: An extension of identification of a copying operation once time or a copying operation free. Designates the number of times of a copying operation. CN is valid only for the first copy generation. The value of CN is decremented by 1 whenever a copying operation is performed.
  Value: 00: prohibits a copying operation; 01 to 0xFE: permitted number of times of a copying operation; 0xFF: freely permits a copying operation.
  The forgoing track information area TRKINF is followed by a data group of 24 bytes starting from 0x0370. This data group is referred to as part information area PRTINF for managing parts. When one track is composed of a plurality of parts, data groups PRTINF are arranged in the chronological order. FIG. 25 shows a data group of PRTINF. Next, the data group of PRTINF will be successively described.
PRTSIZE (Four Bytes)
  Meaning: Part size
  Function: Represents the size of a part. cluster: two bytes (most significant two bytes), beginning SU: one byte (high order one byte), end SU: one byte (least significant one byte)
  Value: cluster: 1 to 0x1F40 (8000), beginning SU: 0 to 0xA0 (160), end SU: 0 to 0xA0 (160)) (Note that SUs are counted from 0).
PRTKEY (Eight Bytes)
  Meaning: Value for encrypting a part.
  Function: initial value=0 When a part is edited, the editing rules should be applied.
  Value: 0 to 0xFFFFFFFFFFFFFFFF
CONNUM0 (Four Bytes)
  Meaning: Content cumulative number key which has been initially created.
  Function: A role of ID for uniquely identifying a content.
  Value: Same value as content cumulative number initial value key
  The attribute header of an ATRAC3 data file contains additional information INF as shown in FIG. 20. Except that the start position of the additional information is not fixed, it is the same as the additional information INF-S (see FIGS. 18 and 19B) of the album reproduction management file. The last byte portion (a multiple of four bytes) of one or a plurality of parts is immediately followed by data of additional information INF.
INF
  Meaning: Data of addition information with respect to a track.
  Function: Variable length data of additional information having a header. A plurality of groups of additional information may be arranged. Each group of additional information contains an ID and a data size. Each group of additional information contains a header and is composed of min. 16 bytes which is a multiple of four bytes.
  Value: Same as additional information INF-S of the reproduction management file.
  The forgoing attribute header is followed by data of each block of an ATRAC3 data file. As shown in FIG. 26, each block contains a header. Next, a data group of each block will be described.
BLKID-A3D (Four Bytes)
  Meaning: BLOCKID FILE ID
  Function: A value for identifying the beginning of ATRAC3 data.
  value: fixed value="A3D" (for example, 0x41334420)
MCode (Two Bytes)
  Meaning: MAKER CODE
  Function: a code for identifying a maker and a model of a device which has recorded the file.
  Value: High order 10 bits (maker code); low order six bits (model code)
CONNUM0 (Four Bytes)
  Meaning: Content cumulative number which has been initially created.
  Function: A role of ID for uniquely identifying a content. The value of CONNUM0 is not changed when the content is edited.
  Value: Same value as content cumulation number initial value key
Block Serial (Four Bytes)
  Meaning: Serial number assigned to each track
  Function: The value of BLOCK SERIAL starts with 0 and increments by +1. Even if the rack is edited, the value of BLOCK SERIAL is not changed.
  Value: 0 to 0xFFFFFFFF
BLOCK-Seed (Eight Bytes)
  Meaning: One key for encrypting one block.
  Function: Assigns a random number generated by a security block of a recording device to the beginning block, increments the generated random number by +1, assigns the incremented random number to the next block, and so forth. When the value of BLOCK-SEED is lost, no sound is output for around one second equivalent to one block. To prevent that, the same value is written to the header and the end of the block. Even if the track is edited, the value of BLOCK-SEED is not changed.
  Value: A random number of eight bytes (initial value)
Initialization Vector (Eight Bytes)
  Meaning: Initial value necessary for encrypting and decrypting each block of ATRAC3 data.
  Function: When the current block is the beginning block, the value of INITIALIZATION VECTOR is 0. When the current block is the next block, the value of INITIALIZATION VECTOR is the last eight bytes of the end SU which has been encrypted. When the current block is a divided block, the value of INITIALIZATION
SU-nnn
  Meaning: Data of sound unit
  Function: Data of which 1024 samples have been compressed. The number of output bytes varies depending on the compression mode. Even if the track is edited, the value of SU-nnn is not changed (for example, in the SP mode, N=384 bytes).
  Value: A data value of ATRAC3
  In FIG. 20, since N=384, 42 SUs are written in one block. The first two slots (four bytes) of one block are a header. In the last one slot (two bytes), BLKID-A3D, MCode, CONNUM0, and BLOCK SERIAL are dually written. Thus, the remaining M bytes of one block are (16,384−384×42−16×3=208 bytes). In the remaining area, as was described above, BLOCK SEED of eight bites is dually recorded.

Using the forgoing album number management file, album reproduction management file, and music file, the album reproduction order of 1 to 500 albums, music program (track) reproduction order of each album, a recordable track, an album name of each album, a track name of each track, an artist name of each of albums/tracks, a total play time of each album, and a play time of each track can be obtained. However, to actually obtain them, it is necessary to open and read each file stored in the HDD 309. As a result, a comfortable operating environment cannot be achieved as a system. Thus, the forgoing information is formed as a database. To allow the user to quickly obtain his or her desired information, besides the forgoing files, album/track name database file Namedb and reproduction time management database file Playtime have been created under HiFi directory. Next, these files will be described.

FIG. 27 shows the structure of album/track name database file Namedb. Namedb is a file for searching Pblist, Pbxxxxxx, name fields NM1 and MN2 of A3dxxxxx, and additional information INF (artist name) for a desired name (album name, music program name, or artist name) at high speed. Only names have been recoded in album/track name database file Namedb. Namedb is composed of nine album name blocks and 323 music program name blocks, 16 kB each.

Each block (16 kB) is composed of one BLK record (eight bytes, fixed) and 62 name records (264 bytes, fixed (62 records)). Thus, 558 (=62×9) name records of album name blocks can be recorded. However, according to the embodiment of the present invention, only 510 name records are validated. The other name records are treated as invalid data (0x00, fixed). On the other hand, 20,0026 (=323×62) name records of music program name blocks can be recorded. Likewise, according to the embodiment of the present invention, only 20,0000 name records are validated. The other name records are treated as invalid data (0x00, fixed). The file size is 332 blocks×16384 (16 kB)=5439488 bytes (5312 kB).

Figure 28:
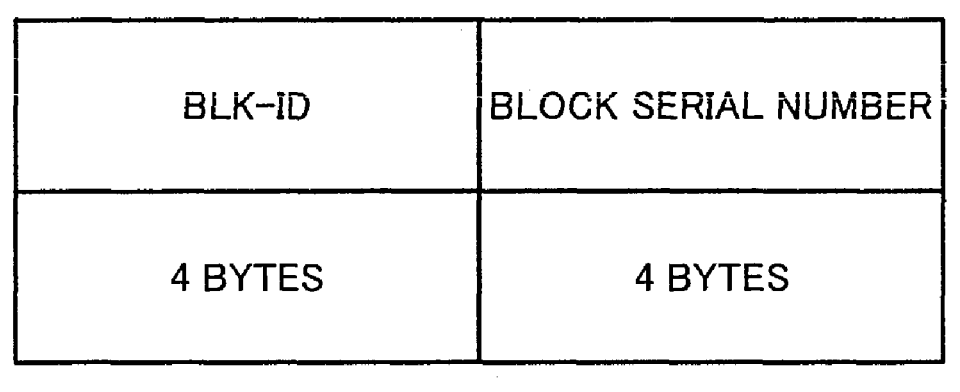

FIG. 28 shows the structure of a BLK record. BLK-ID (four bytes) of an album name block is "ANMO" which is a fixed character string. BLK-ID (four bytes) of a program name block is "TNMO" which is a fixed character string. Block serial number (four bytes) is a serial number starting with 1.

FIG. 29 shows the structure of a name record. Name records are recorded in the order of album file numbers 1 to 500 and program file numbers 1 to 20000. When the album/program file number of a name record is 0, it is treated as invalid data.

FIG. 30 shows the structure of reproduction time management database file Playtime.msf. Playtime is a file for obtaining the total play time of each album at high speed. This file contains a play time for each music program. In addition, the file contains an index corresponding to TOC information of a TOC database (which will be described later) and TNO. Playtime is composed of 15 blocks (16 kB, each).

Each block (16 kB) is composed of one BLK record (eight bytes, fixed), 1365 TRK records (12 bytes, fixed) (1365)), and a reserved record (four bytes, fixed (0x00 fixed)). Thus, 20475 (=1365×15) TRK records can be recorded. However, according to the embodiment of the present invention, up to 20,000 TRK records are validated. The other TRK records are treated as invalid data (0x00, fixed). The file size of Playtime is 15 blocks×16384=245760 bytes (240 kB).

Figure 31:
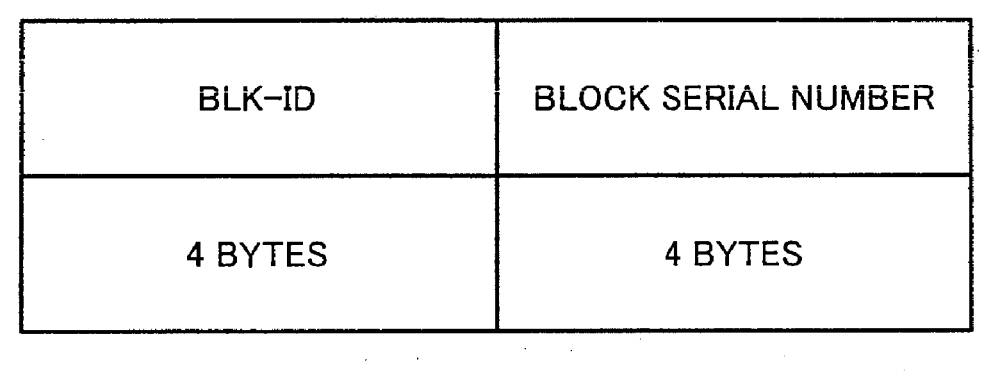

FIG. 31 shows the structure of a BLK record portion of the format of a record. BLK-ID is "TRKO" which a fixed character string. Block serial number is a sequence number starting with 1.

FIG. 32 shows the structure of a TRK record. TRK records are recorded in the order of music program file numbers 1 to 20000. When the album file number of a TRK record is 0, it is treated as invalid data. Since no album file number is set in a play list, the total play time of a play list can be calculated by obtaining TRK records from reproduction order file numbers of Pbnnnnnn.MSF (nnnnnn: 0001F5 to 0001FE).

In the dubbing apparatus according to the embodiment of the present invention, a synchronous recording operation can be performed from the disc reproducing device 200 as a source to the HD recording and reproducing device 300 as a destination. Before the synchronous recording operation is started, the HD recording and reproducing device 300 requests the disc reproducing device 200 to transmit TOC data of a CD from which the disc reproducing device 200 will reproduce audio data. As another data requesting method, besides the system control signal shown in FIG. 1, an IEC 60958 audio signal may be input to the HD recording and reproducing device 300. With the digital interface circuit of the HD recording and reproducing device 300, information contained in U bit of the audio signal may be analyzed. The TOC information of the CD as the source is stored in a database file. When a site from which CD information can be obtained is connected on the Internet, names of albums and tracks recorded on the HD recording and reproducing device 300 are assigned. This role is performed using database file Tocdb.

Figures 33, 34:
FIG. 33 is a schematic diagram showing the structure of CD TOC database file Tocdb.msf.
FIG. 34 shows a block ID portion of CD TOC database file Tocdb.msf.

FIG. 33 shows the structure of TOC database file Tocdb. TOC database file Tocdb is a file for assigning album names and track names to albums and tracks recorded in the HD recording and reproducing device 300 using a site of for example CDDB on the Internet. This file contains TOC information for searching CDDB or the like. The system controller 100 accesses a site of CDDB on the Internet through an external device (for example, a personal computer) connected to the external control signal input and output portion 500.

File Tocdb is composed of 13 blocks (16 kB each). Each block (16 kB) is composed of a BLK record (eight bytes, fixed), ALBUM TOC records (412 bytes, fixed (39 records)), and a reserved record (308 bytes, fixed (0x00)). Although up to 507 (=39×13) ALBUM TOC records can be recorded, according to the embodiment of the present invention, up to 500 ALBUM TOC records are validated. The other ALBUM TOC records are treated as invalid data (0x00). The file size of Tocdb is 13 blocks×16384=212992 bytes (208 kB).

FIG. 34 shows the structure of a block record. BLK-ID is "TOCO" which is a fixed character string. Block serial number is a serial number starting with 1. Album number is the number of ALBUM TOC records (1 to 500).

FIG. 35 shows the structure of an Album TOC record. As shown in FIG. 35, an Album TOC record is composed of TOC DB IDX, use state, and TOC information.

FIG. 36 shows details of TOC information. As shown in FIG. 36, TOC information is composed of Trk No. (one byte), AMIN (one byte), ASEC (one byte), and AFRAME (one byte). Trk No. is a track number ranging from 1 to 20000. AMIN, ASEC, and AFRAME are an absolute time minute component, an absolute time second component, and an absolute time frame number of a track corresponding to a track number recoded in Trk No, respectively.

There is a relation between an ALBUM TOC record of Tocdb and a TRK record portion (TOCDB IDX and TOC TNO) of Playtime. In other words, with track information of Playtime, the relation between tracks and TNOs of TOCs of Tocdb can be obtained. Thus, even if an audio file is edited or deleted, a correct music program name thereof can be obtained from CDDB.

As was described above, in the HD recording and reproducing device 300, editing operations can be performed. The editing operations include music program (track) dividing operation, music program (track) combining operation, music program (track) erasing operation, album erasing operation, music program moving operation, album moving operation, album name assigning operation, album artist name assigning operation, music program (track) name assigning operation, and music program (track) artist name assigning operation. Whenever an editing operation has been performed, databases except for Tocdb are updated and managed so that there is no inconsistency between entities and the databases.

Figure 37:
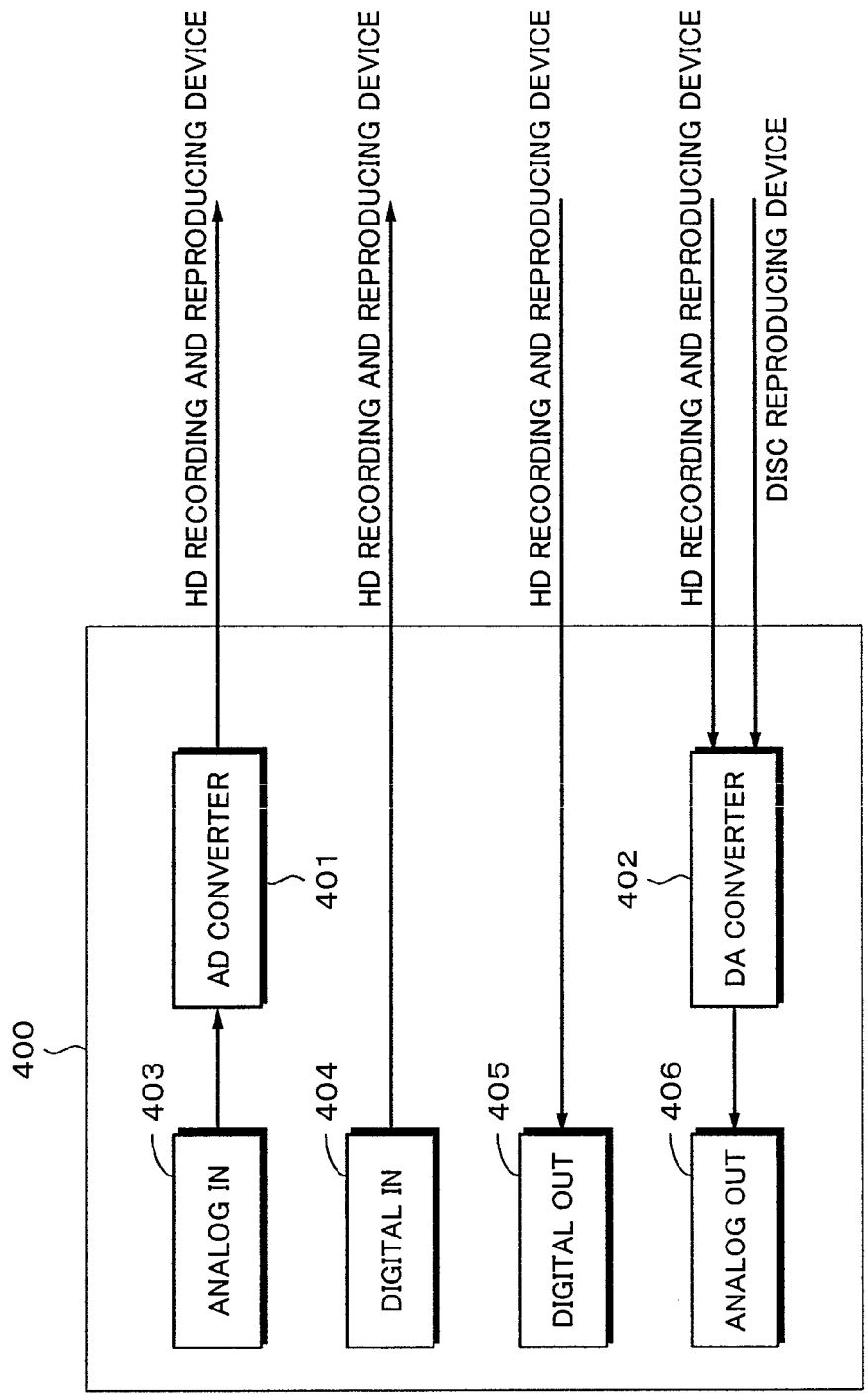
FIG. 37 is a block diagram showing an example of the structure of an audio input and output portion according to the embodiment of the present invention.

FIG. 37 is a block diagram showing an example of the structure of the audio input and output portion 400. As shown in FIG. 37, the audio input and output portion 400 is composed of an A/D converter 401, a DA converter 402, an analog input terminal 403, a digital input terminal 404, a digital output terminal 405, and an analog output terminal 406.

The AD converter 401 converts an analog signal supplied from the analog input terminal 403 into a serial signal which synchronizes with an LR clock and a bit clock and supplies the serial signal to the AD/DA I/F 302 of the HD recording and reproducing device 300.

The DA converter 402 converts audio data supplied from the disc reproducing device 200 or the HD recording and reproducing device 300 (for example, audio data corresponding to IEC 60958 format) into analog data and supplies the analog signal to the analog output terminal 406. The DA converter 402 not only outputs audio data, but mutes audio data corresponding to a request issued from the disc reproducing device 200 or the HD recording and reproducing device 300.

The analog input terminal 403 is a terminal for inputting an analog signal. An analog signal which is supplied to the analog input terminal 403 is supplied to the AD converter 401.

The digital input terminal 404 is a terminal for inputting a digital signal. A digital signal which is input to the digital input terminal 404 is supplied to the digital audio I/F 301 of the HD recording and reproducing device 300.

When the HD recording and reproducing device 300 is in a recording mode, an audio signal which is input to the HD recording and reproducing device 300 is output as a monitor sound from the analog output terminal 406 (which will be described later).

The digital output terminal 405 is a terminal for outputting a digital audio signal supplied from the digital audio I/F 301 of the HD recording and reproducing device 300 to an external device or the like.

The analog output terminal 406 is a terminal for outputting an analog signal supplied from the DA converter 402 to an external device or the like.

The external control signal input and output portion 500 allows the external device (for example, a personal computer) and the dubbing apparatus to communicate with each other. The external control signal input and output portion 500 is for example a USB (Universal Serial Bus) connector.

Next, a searching operation of the dubbing apparatus according to the embodiment of the present invention will be described. In this example, assuming that albums 1 to 8 have been stored in the HD recording and reproducing device 300 as shown in FIG. 38, a searching operation will be described.

FIG. 39 shows detailed information of album 8 shown in FIG. 38. FIG. 39 shows track numbers, track names, artist names, and time periods of highlight portions.

Figure 40:
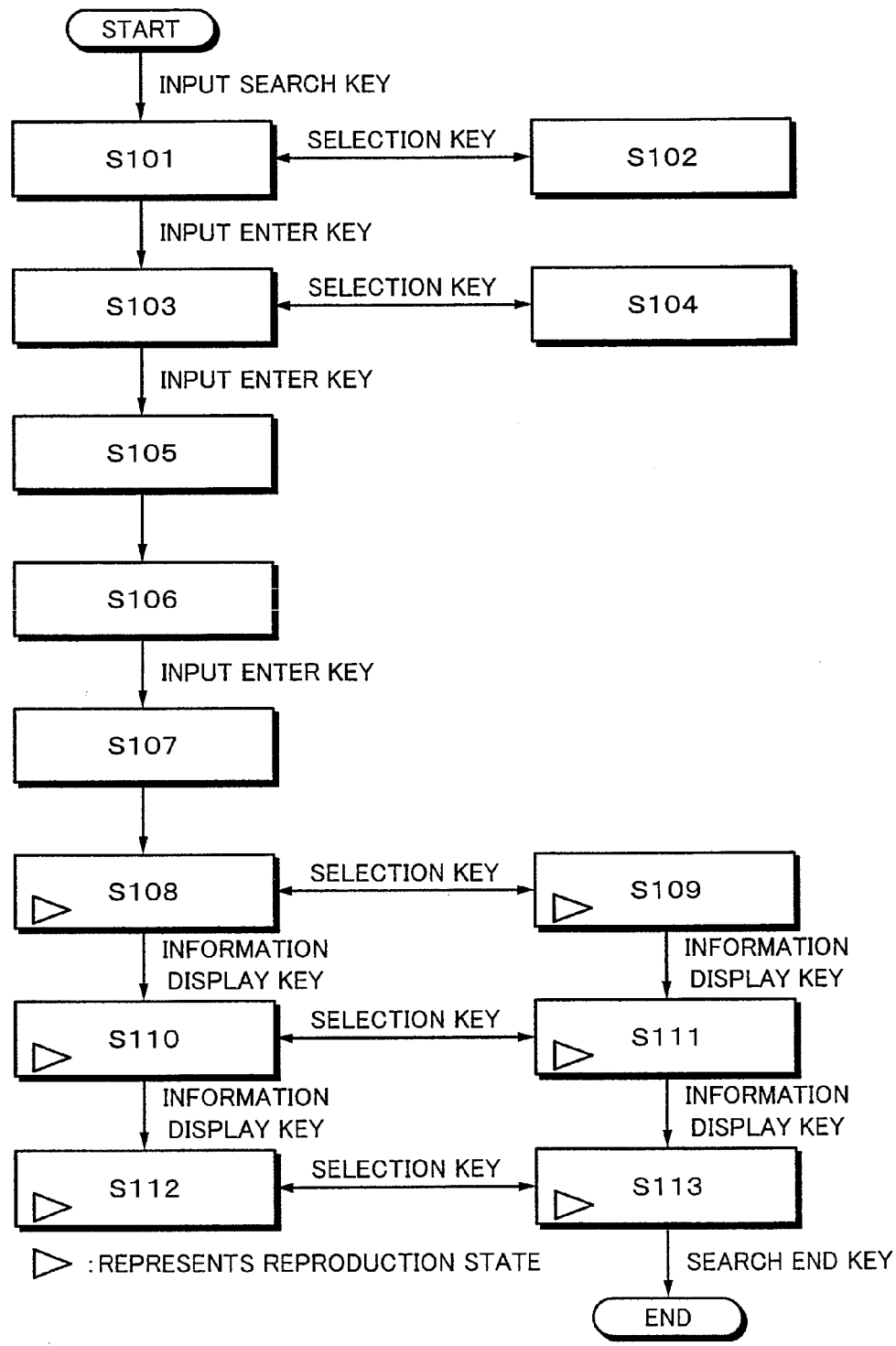
FIG. 40 is a flow chart for explaining an album searching operation and process using an album name.

FIG. 40 is a flow chart for explaining an album searching operation and process using an album name. In this example, albums stored in the HD recording and reproducing device 300 are searched for albums having an album name containing character string "P" and then highlight portions of tracks of the obtained albums are reproduced.

When the controller 101 has received a search start request from the user through the operating device 103, the controller 101 causes the display device 102 to display message "For album ?" which prompts the user to select album search (at step S101). When the controller 101 has judged that the selection key on the operating device 103 had been pressed, the controller 101 causes the display device 102 to display message "For Track ?" which prompts the user to select track search (at step S102).

Thereafter, when the controller 101 has judged that the user had selected album search, the controller 101 causes the display device 102 to display message "By Title ?" which prompts the user to select title name search (at step S103). When the controller 101 has judged that the selection key of the operating device 103 had been pressed, the controller 101 causes the display device 102 to display message "By Artist ?" which prompts the user to select artist name search (at step S104).

Thereafter, the controller 101 has judged that the enter key had been pressed while message "By Title ?" had been displayed, the controller 101 causes the display device 102 to display message "keyword In" which prompts the user to input a key word (at step S105).

Thereafter, while the user is browsing data displayed on the display device 102, he or she operates the jog key of the operating device 103, inputs key word "P" for a search, and presses the enter key (at step S106).

When the controller 101 has judged that the enter key had been pressed, the HD recording and reproducing device 300 references album/track name database file Namedb.msf stored in the HDD 309 and searches the database file Namedb.msf for album title names containing the input key word which has been input at step S106 (at step S107).

Thereafter, the controller 101 causes the display device 102 to display search result "1/2" and successively reproduces highlight portions of tracks of an album corresponding to the search result (at step S108). When the controller 101 has judged that the selection key had been pressed, the controller 101 causes the display device 102 to display search result "2/2" and successively reproduces highlight portions of tracks of an album corresponding to the search result (at step S109). Search results "1/2" and "2/2" displayed on the display device 102 are examples in the case that there are two albums corresponding to the key word.

Thereafter, when the controller 101 has judged that the information display key had been pressed while search result "1/2" had been displayed on the display device 102, the controller 101 causes the display device 102 to display message "Album 2" which informs the user of an album number corresponding to search result "1/2" (at step S110). When the controller 101 has judged that the selection key had been pressed, the controller 101 causes the display device 102 to display message "Album 3" which informs the user of an album number corresponding to search result "2/2" (at step S111).

Thereafter, when the controller 101 has judged that the information display key had been pressed while message "Album 2" had been displayed on the display device 102, the controller 101 causes the display device 102 to display message "Pornograffitti" which informs the user of an album name corresponding to message "Album 2" (at step S112). When the controller 101 has judged that the selection key had been pressed, the controller 101 causes the display device 102 to display message "Master of Puppets" which informs the user of an album name corresponding to message "Album 3" (at step S113).

If the album name of user's desired album is "Master of Puppets", when the user presses the search end key at step S113, tracks of the album are automatically and successively reproduced from the beginning.

After highlight portions of tracks of one album have been reproduced, the highlight portions are repeatedly reproduced from the beginning. In other words, highlights of tracks of an album corresponding to the next search result are not reproduced without user's operation.

In the forgoing example, when the search end key is pressed while an album name is being displayed on the display device 102, tracks of an album corresponding to the album name are successively reproduced from the beginning. Alternatively, when the search end key is pressed while an album number is being displayed on the display device, tracks of an album corresponding to the album number may be reproduced from the beginning.

In addition, when the search end key is pressed while search result "1/2" or "2/2" is being displayed, tracks of an album corresponding to the search result "1/2" or "2/2" may be reproduced from the beginning.

Figure 41:
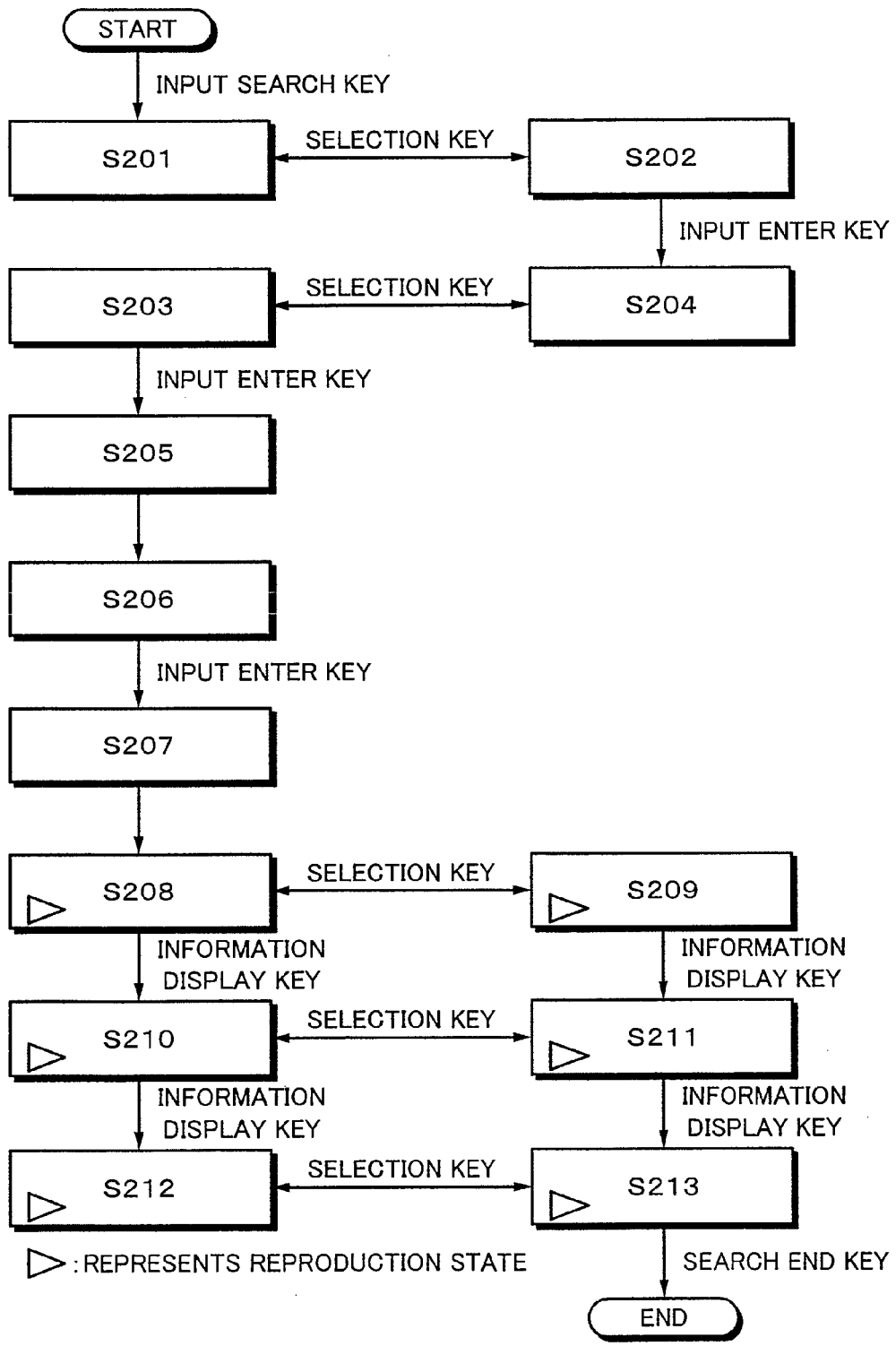
FIG. 41 is a flow chart for explaining a track searching operation and process using an artist name.

FIG. 41 is a flow chart for explaining a track searching operation and process using an artist name. In this example, it is assumed that tracks stored in the HD recording and reproducing device 300 are searched for tracks containing character string "Weathe" and then the obtained tracks are reproduced.

When the controller 101 has received a search start request from the user through the operating device 103, the controller 101 causes the display device 102 to display message "For Album ?" which prompts the user to select album search (at step S201).

Thereafter, when the controller 101 has judged that the selection key of the operating device 103 had been pressed, the controller 101 causes the display device 102 to display message "For track ?" which prompts the user to select track search (at step S202).

Thereafter, when the controller 101 has judged that the user had selected track search, the controller 101 causes the display device 102 to display message "By Title ?" which prompts the user to select track title name search (at step S203).

Thereafter, when the controller 101 has judged that the selection key of the operating device 103 had been pressed, the controller 101 causes the display device 102 to display message "By Artist ?" which prompts the user to select track artist name search (at step S204).

Thereafter, when the controller 101 has judged that the enter key had been pressed while artist message "By Artist ?" had been displayed, the controller 101 causes the display device 102 to display message "Keyword IN" which prompts the user to input a key word (at step S205).

Thereafter, while the user is browsing data display on the display device 102, he or she operates the jog key of the operating device 103, inputs key word "Weather" for a search, and presses the enter key (at step S206).

Thereafter, when the controller 101 has judged that the enter key had been pressed, the HD recording and reproducing device 300 references album/track name database file Namedb.msf stored in the HDD 309 and searches the database file Namedb for tracks containing the key words which has been input at step S206 (at step S207).

Thereafter, the controller 101 causes the display device 102 to display search result "1/7" and reproduces a track corresponding to the search result (at step S208). When the controller 101 has judged that the selection key had been pressed, the controller 101 causes the display device 102 to display search result "2/7" and reproduces a track corresponding to the search result (at step S209). Search results "1/7" and "2/7" are examples in the case that there are seven tracks corresponding to the key word.

Thereafter, when the controller 101 has judged that the information display key had been pressed while search result "1/7" had been displayed on the display device 102, the controller 101 causes the display device 102 to display message "Block Market" which informs the user of a track name corresponding to message "1/7" (at step S210). When the controller 101 has judged that the selection key had been pressed, the controller 101 causes the display device 102 to display message "Teen Town" which informs the user of a track name corresponding to message "2/7" (at step S210).

Thereafter, when the controller 101 has judged that the information display key had been pressed while message "Black Market" had been displayed on the display device 102, the controller 101 causes the display device 102 to display message "Album 8 Track 1" which informs the user of an album number and a track number corresponding to "Black Market" (at step S212). When the controller 101 has judged that the selection key had been pressed, the controller 101 causes the display device 102 to display message "Album 8 Track 2" which informs the user of an album number and a track number corresponding to "Teen Town" (at step S213).

When the album name of user's desired album is "Album 8 Track 2", at step S213, the user presses the search end key so as to complete the searching operation and process. Even if the search end key is pressed, the track is still reproduced.

In the forgoing example, while an album number and a track number are being displayed, when the search end key is pressed, a track corresponding to the album number and the track number is reproduced. Alternatively, while a track name is being displayed on the display device 102, when the search end key is pressed, a track corresponding to the track name may be reproduced.

In addition, when the search end key is pressed while search result "1/7", . . . , or "7/7" is being displayed, a track corresponding to the search result "1/7", . . . , or "7/" may be reproduced.

Figure 42:
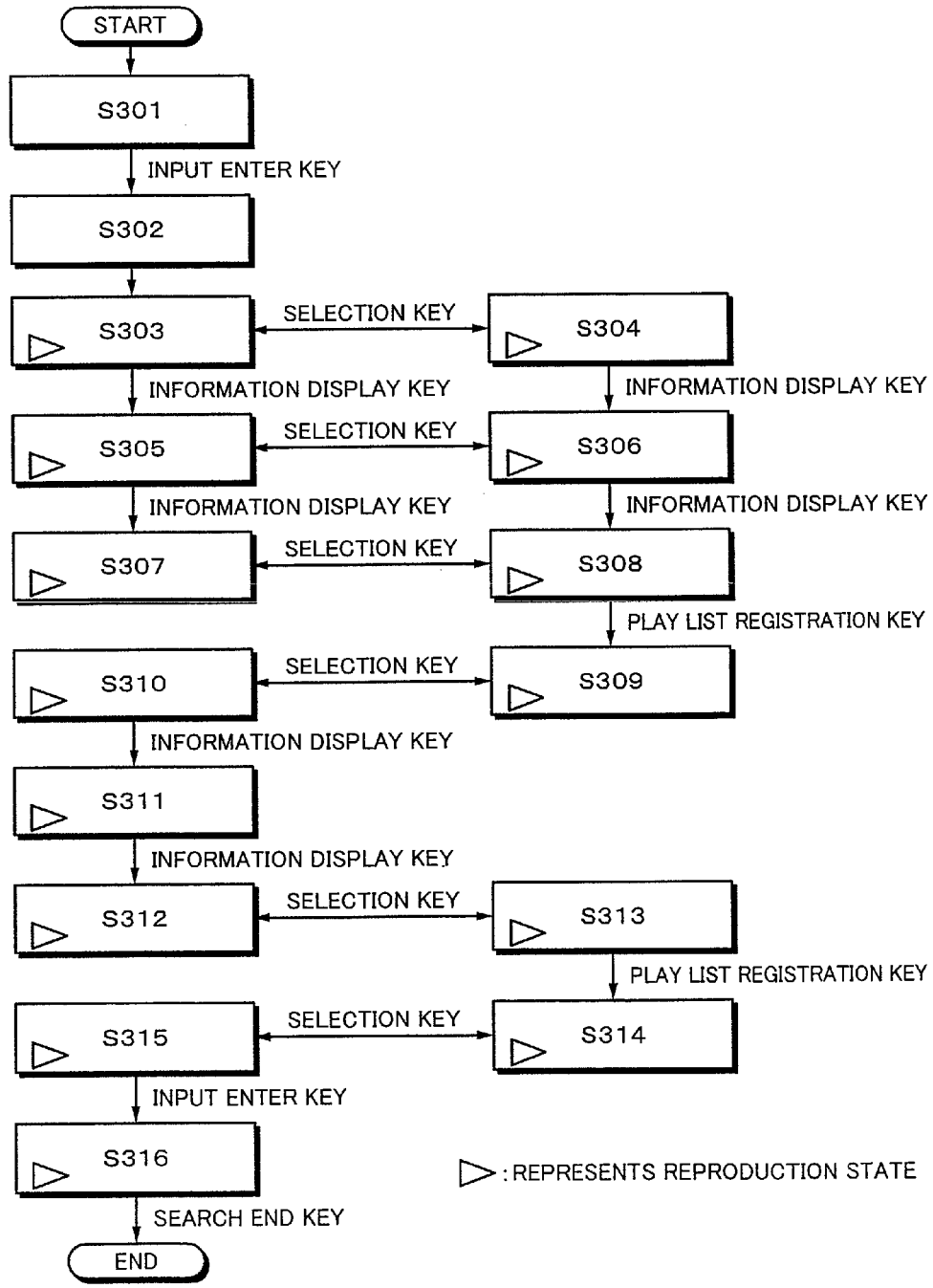
FIG. 42 is a flow chart for explaining a registering operation and process for registering a search result to a play list.

FIG. 42 is a flow chart for explaining a registering operation and process for registering a search result to a play list. In this example, it is assumed that albums which have album names containing character string "it" are searched and then and one of albums as search results is registered to a play list. In this example, since steps until a key word is input are the same as steps in the forgoing searching operations and processes shown in FIGS. 40 and 41, the description for those steps will be omitted.

First of all, while the user is browsing data displayed on the display device 102, he or she operates the jog key of the operating device 103, inputs key word "it" for a search, and presses the enter key (at step S301).

Thereafter, when the controller 101 has judged that the enter key had been pressed, the HD recording and reproducing device 300 references album/track name database file Namedb stored in the HDD 309 and searches the database file for albums which have album names containing the key word which has been input at step S301 (at step S302).

Thereafter, the controller 101 causes the display device 102 to display search result "1/2" and reproduces a track corresponding to the search result (at step S303). When the controller 101 has judged that the selection key had been pressed, the controller 101 causes the display device 102 to display search result "2/2" and reproduces a track corresponding to the search result (at step S209).

Thereafter, when the controller 101 has judged that the information display key had been pressed while search result "1/2" had been displayed on the display device 102, the controller 101 causes the display device 102 to display message "Album 2" which informs the user of an album name corresponding to message "1/2" (at step S304). When the controller 101 has judged that the selection key had been pressed, the controller 101 causes the display device 102 to display message "Album 5" which informs the user of a track name corresponding to message "2/2" (at step S306).

Thereafter, when the controller 101 has judged that the information display key had been pressed while "Album 2" had been displayed on the display device 102, the controller 101 causes the display device 102 to display message "Pornograffitti" which informs the user of an album name corresponding to "Album 2" (at step S307). When the controller 101 has judged that the selection key had been pressed, the controller 101 causes the display device 102 to display message "A day without Rain" which informs the user of an album name corresponding to "Album 5" (at step S308).

Thereafter, when the controller 101 has judged that the play list registration key had been pressed while "A day without Rain" had been displayed, the controller 101 causes the display device 102 to display message "P. List 501 ?" which asks the user whether to register the search result to play list 501 (album number 501) (at step S309).

Thereafter, when the controller 101 has judged that the selection key had been pressed, the controller 101 causes the display device 102 to display message "P. List 502" which asks the user whether to register the search result to play list 502 (album number 502). With the dubbing apparatus according to the embodiment of the present invention, the user can select play list 510 (album number 510) or play list 502 (album number 502) as a play list to which the search result is registered.

Thereafter, when the controller 101 has judged that the information display key had been pressed while "P. List 502" had been displayed on the display device 102, the controller 101 registers all tracks of an album corresponding to album name "A day without Rain" to play list 502 and causes the display device 102 to display message "Complete !!" which informs the user that the search result has been registered to the play list (at step S311).

Thereafter, when the controller 101 has judged that an operation for returning to the display result screen had been performed with the operating device 103, the controller 101 causes the display device 102 to display search result "2/2", and reproduces a track corresponding to the search result (at step S312).

Thereafter, when the controller 101 has judged that the selection key had been pressed, the controller 101 causes the display device 102 to display search result "1/2" and reproduces a track corresponding to the search result (at step S313).

Thereafter, when the controller 101 has judged that the play list registration key had been pressed while search result "1/2" had been displayed on the display device 102, the controller 101 causes the display device 102 to display message "P. List 501 ?" which asks the user whether to register search result "1/2" to play list 501 (album number 501) (at step S314).

Thereafter, when the controller 101 has judged that the selection key for displaying play list 509 (album number 509) on the display device 102 had been pressed, the controller 101 causes the display device 102 to display message "P. List 509 ?" which asks the user whether to register the search result to play list 509 (album number 509) (at step S315).

Thereafter, when the controller 101 has judged that the information display key had been pressed while "P. List 509 ?" had been displayed, the controller 101 registers all tracks of an album corresponding to search result "1/2" to play list 509, and causes the display device 102 to display message "Complete !!" which informs the user that the search result has been registered to the play list (at step S316). To exit from the search mode, the user presses the search end key.

A highlight portion which has been mentioned earlier is a portion such as a climax of a music program or a climax scene of a story of a movie (video signal). With a highlight portion as a part of a music program or a movie, the user can recognize the entire music program or the entire movie. A highlight portion is also called digest.

As was described above, according to the embodiment of the present invention, since the user can easily search a large number of tracks/albums stored in a hard disk for his or her desired track/album, the management work which the user should have performed so far can be remarkably reduced.

In addition, since a database with which a search can be performed at high speed is stored in the HDD 309, even if a large number of tracks/albums are stored in the hard disk, a search time can be remarkably shortened. Thus, according to the embodiment of the present invention, the user is provided with a comfortable operation environment.

In addition, the user can select an album search or a track search. In addition, the user can select an album name, a track name, or an artist name as a search key word. Thus, the user can quickly search for his or her desired album or track.

In addition, as a feature of an audio device, a search result can be reproduced. In other words, besides data displayed on the display device 102, the user can listen to music and identify a search result. As a result, since the user can browse a search result while listening to music corresponding to the search result, he or she can be prevented from mistaking a search object. This is because as a benefit of hard disk audio beginning portions of music programs can be detected at high speed.

In addition, when an album search is performed, since a searching function of the present invention provides browsing and reproducing functions for a search result, highlight portions of all tracks of the album are identified and successively reproduced. In other words, since the user can listen to digests which are highlight portions of an album, he or she can identify his or her desired album without need to listen to all the album which is identified with a key word.

With the searching function of the present invention, searched albums/tracks can be reproduced. In addition, searched album/tracks can be easily registered as a play list album which is a collection of user's favorite music programs.

In addition, with the play list registering function of the searching function of the present invention, all music programs of an album as a search object can be registered to a play list. Thus, the user does not need to manually register music programs one after the other.

In addition, with the searching function of the present invention, while the search mode is valid, since search results are kept, after one search result is registered to a play list, another search result can be registered to another play list.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

In addition, according to the forgoing embodiment, it is assumed that the optical disc is a CD. Alternatively, the optical disc may be a DVD (Digital Versatile Disc) or the like.

In addition, according to the forgoing embodiment, it is assumed that music data is stored in the HD recording and reproducing device 300. Alternatively, video data, audio data, and so forth may be stored in the HD recording and reproducing device 300.

In addition, according to the forgoing embodiment, it is assumed that the dubbing apparatus has a reproducing device which reproduces audio data from an optical disc. The reproducing device may reproduce data from another type of a recording medium. For example, the reproducing device may reproduce data from a magnetic tape such as a music tape, a video tape, or a DAT (Digital Audio Tape). Alternatively, the reproducing device may reproduce data from a magnetic disc such as a ZIP. Alternatively, the reproducing device may reproduce data from a non-volatile memory.

When a plurality of music programs are obtained as search results in a music program name search, highlight portions of music programs as search results may be successively reproduced.

After the highlight portion of the last music program of the search results has been reproduced, the highlight portions of the music programs of the search results may be successively reproduced from the beginning as a loop reproduction.

While a highlight portion of a selected music program is being reproduced, when the enter key is pressed, the selected music program may be reproduced from the beginning.

When a plurality of albums have been obtained as search results in an album name search, highlight portions of representative music programs of the albums as the search results may be successively reproduced.

After the highlight portion of the representative music program of the last album of the search results has been reproduced, the highlight portions of the representative music programs of the albums of the search results may be successively reproduced from the beginning as a loop reproduction.

A highlight portion which has been mentioned earlier is a portion such as a climax of a music program or a climax scene of a story of a movie (video signal). With a highlight portion as a part of a music program or a movie, the user can recognize the entire music program or the entire movie. A highlight portion is also called digest.

As was described above, according to the present invention, since the user can easily search a plurality of programs stored in a recording medium for his or her desired program, the management work which the user should have performed so far can be remarkably reduced.

Since the user can not only browse information with respect to programs as search results, but reproduce the search results, he or she can intuitively search for his or her desired programs. In addition, even if the user does not know an album name or a track name for which he or she want to search, he or she can easily do that.

The invention claimed is:

1. A searching apparatus for searching for a desired group of tracks recorded on a local storage medium, the searching apparatus comprising:

a local storage medium for storing a plurality of tracks and management data, the tracks being managed as groups of albums and artists in the management data, group names and track names of tracks of the groups being managed in the management data, a plurality of highlight portion information of the each tracks which represent highlight portion of said tracks being managed in the management data;

input means for inputting information to designate a type of group to be searched and a keyword, the input means configured to prompt a user for a keyword associated with a first type of group, and then upon receiving a response from the user, prompting the user for a keyword associated with a second type of group;

comparing means for comparing any keyword which has been input by the input means with the group names managed in the management data of the local storage medium when the type of name input to the input means is group name;

displaying means for displaying a group candidate list in accordance with compared results of the comparing means;

controlling means for causing the displaying means to display the candidate list and automatically starting reproduction of highlight portions of tracks of the group on the candidate list, wherein the controlling means is configured to automatically successively reproduce highlight portions of the tracks of the group on the candidate list;

dubbing means for reproducing the tracks of the group on the candidate list, when activated, the dubbing means including a synchronous recording means that synchronously starts and/or stops dubbing of the tracks of the group on the candidate list, when activated;

wherein the input means prompts the user for the keyword associated with the second type of group after the display means has displayed a group candidate list in accordance with compared results of the keyword associated with the first type of group;

wherein there are a plurality of programs or groups on the candidate list, and wherein the controlling means is configured to successively reproduce highlight portions of the programs or groups on the candidate list.

2. A searching method for searching for a desired group recorded on a local storing unit, a plurality of tracks and management data having been recorded on the local storing unit, the tracks being managed as groups of albums and artists in the management data, group names and tracks names of tracks of the groups being managed in the management data, highlight portions of representative tracks of the groups and highlight portions of the tracks being managed in the management data, the searching method comprising the steps of:

prompting a user for a keyword associated with a first type of group, and then upon receiving a response from the user, comparing any keyword which has been input with the group names managed in the management data of the local storing unit;

displaying a group candidate list in accordance with compared results obtained at the comparison and then;

prompting the user for a keyword associated with a second type of group, and then upon receiving a response from the user, comparing any keyword which has been input with the group candidate list;

displaying a group candidate list in accordance with compared results obtained at the comparison of the keywords associated with the first type of group and of the second type of group;

automatically starting reproduction of highlight portions of the tracks of the group on the candidate list, wherein when there are a plurality of tracks of a group on the candidate list, the reproducing is performed by automatically successively reproducing highlight portions of the tracks of the group on the candidate list;

synchronously dubbing the tracks of the group on the candidate list, when a dubbing apparatus is activated;

wherein when there are a plurality of programs or groups on the candidate list, the reproducing is performed by successively reproducing highlight portions of the programs or groups on the candidate list.

* * * * *